United States Patent [19]

Dreste et al.

[11] Patent Number: 5,388,252

[45] Date of Patent: Feb. 7, 1995

[54] SYSTEM FOR TRANSPARENT MONITORING OF PROCESSORS IN A NETWORK WITH DISPLAY OF SCREEN IMAGES AT A REMOTE STATION FOR DIAGNOSIS BY TECHNICAL SUPPORT PERSONNEL

[75] Inventors: Robert A. Dreste, Webster; Mark R. Scheda, Brockport; Howard C. Bozenhard, Webster, all of N.Y.

[73] Assignee: Eastman Kodak Company, Rochester, N.Y.

[21] Appl. No.: 578,941

[22] Filed: Sep. 7, 1990

[51] Int. Cl.6 .................. G06F 11/00; G06F 13/00
[52] U.S. Cl. ...................... 395/575; 395/200; 395/700; 382/7; 364/DIG. 1; 364/267; 364/267.2; 364/267.4; 364/267.5; 364/275.7
[58] Field of Search ............ 395/700, 575, 200, 575, 395/650; 364/436; 358/108, 426; 382/7

[56] References Cited

U.S. PATENT DOCUMENTS

| 4,589,068 | 5/1986 | Heinen, Jr. ................... 395/575 |
| 4,701,845 | 10/1987 | Andreasen et al. ............ 395/575 |
| 4,754,395 | 6/1988 | Weisshaar et al. ............ 395/650 |
| 4,937,784 | 6/1990 | Masai et al. ................... 395/325 |
| 5,109,486 | 4/1992 | Seymour ........................ 395/200 |
| 5,122,959 | 6/1992 | Nathanson et al. ........... 364/436 |
| 5,123,017 | 6/1992 | Simpkins et al. ............. 371/15.1 |
| 5,179,702 | 1/1993 | Spix et al. ..................... 395/650 |
| 5,214,778 | 5/1993 | Glider et al. .................. 395/575 |
| 5,253,078 | 10/1993 | Balkahski et al. ............. 358/426 |

Primary Examiner—Thomas G. Black
Assistant Examiner—Wayne Amsbury
Attorney, Agent, or Firm—Hodgson, Russ, Andrews, Woods & Goodyear

[57] ABSTRACT

A remote diagnostic and monitoring system and method for use with an operation system having a multitasking interface to a real time control system, the remote diagnostic and monitoring system and method comprising a remote diagnostic task operating in an interface computer operatively connected to the operation system, a communication link, and a remote service computer coupled to the interface computer via the communication link. The remote diagnostic task operating on the interface computer can initiate and monitor from a remote location any of the procedures and controls run on the interface computer for controlling and monitoring the operation system. The remote diagnostic task receives instructions from a person at the remote service computer through the communications link and injects these instructions into the operating software of the operation system in a manner such that the remote source, i.e. the remote service computer, is indistinguisable from a local source. The remote diagnostic task is grouped or included with functionally partitioned application tasks in the interface computer and uses the multitasking operating system of the interface computer in the same manner as the application tasks.

38 Claims, 24 Drawing Sheets

D5743 MAIN DIAG MENU

PAPER TRACK READY PARAMETERS SENT
PHOTOGRAPHIC READY PARAMETERS SENT
READY PROCESSING COMPLETE
DIAGNOSTICS MODE IS NOW ON
FILM TRACK READY
PAPER TRACK READY

HELP

RETURN

1020A  MONITOR POWER SUPPLY VOLTAGES

PRESSING THE START TEST BUTTON WILL DO THE FOLLOWING:

MONITOR AND DISPLAY ALL POWER
SUPPLY VOLTAGES WITH THE
EXCEPTION OF THE HIGH VOLTAGE
FILM CLEANER POWER SUPPLY.

E-LOG

START TEST — 146

D-MENU

FIG. 8

D5743 MAIN DIAG MENU

READY PROCESSING COMPLETE
DIAGNOSTICS MODE IS NOW ON
FILM TRACK READY
PAPER TRACK READY
MONITOR POWER SUPPLY DIAGNOSTIC SELECTED
MONITORING STARTED

1020B  MONITOR POWER SUPPLY VOLTAGES    TEST IN PROGRESS-DATA

| | POWER SUPPLY | VOLTAGE | | POWER SUPPLY | VOLTAGE |
|---|---|---|---|---|---|
| 1. | PS0001 +24V | 24.08 | 4. | PS1004 +15V | 14.94 |
| 2. | PS1002 +15V<br>PS1002 -15V | 14.98<br>-15.03 | 5. | PS1005 +5V (MICRO)<br>PS1005 +24V | 5.20<br>24.20 |
| 3. | PS1003 +12V<br>PS1003 -12V<br>PS1003 +5V (SENSORS) | 12.13<br>-12.15<br>5.21 | 6. | PS1006 +42V | 40.82 |
| | | | 7. | AC LINE | OK |

STOP TEST

FIG. 9

SYSTEM FOR TRANSPARENT MONITORING OF PROCESSORS IN A NETWORK WITH DISPLAY OF SCREEN IMAGES AT A REMOTE STATION FOR DIAGNOSIS BY TECHNICAL SUPPORT PERSONNEL

TECHNICAL FIELD

This invention relates to the area of remote diagnosis and monitoring of systems, and more particularly to a new and improved remote diagnostic and monitoring system and method for use with a machine or process requiring a multi-tasking interface to a real time control system.

BACKGROUND OF THE INVENTION

One area of use of the present invention is with a photofinishing machine in the form of a photographic printer which automatically produces correctly exposed color prints from negative film. However, the system and method of the present invention can be used with any machine or process requiring a flexible, multi-tasking interface to a real-time control system. There is need for an effective solution to the difficulties in training support personnel for complex systems like a photographic printer. In providing a remote diagnosis and monitoring capability in such systems, a number of important factors must be considered. One is that the remote diagnosis and monitoring should not cause any change in the behavior of the system under test due to the source of the remote diagnosis and monitoring. Another is that the information from the system under test should be available for display on a real time basis at the location of the remote diagnosis and monitoring for effective analysis of rapidly changing operating parameters.

OBJECTS AND SUMMARY OF THE INVENTION

It would, therefore, be highly desirable to provide a new and improved remote diagnosis and monitoring system and method for use with a machine or process requiring a multi-tasking interface to a real time control system where no change in the behavior of the machine or process under test is effected due to the source of the remote diagnosis and monitoring and where information from the machine or process under test is available for display on a real time basis at the location of the remote diagnosis and monitoring.

The present invention provides a remote diagnostic and monitoring system and method for use with an operation system having a multi-tasking interface to a real time control system, the remote diagnostic and monitoring system and method comprising a remote diagnostic task operating in an interface computer operatively connected to the operation system, a communication link, and a remote service computer coupled to the interface computer via the communication link. The remote diagnostic task operating on the interface computer can initiate and monitor from a remote location any of the procedures and controls run on the interface computer for controlling and monitoring the operation system. The remote diagnostic task receives instruction from a person at the remote service computer through the communications link and injects these instructions into the operating software of the operation system in a manner such that the remote source, i.e. the remote service computer, is indistinguishable from a local source. In other words, the remote operation effects no change in the behavior of the system under test due to the source of the instruction. That is because the remote diagnostic task is grouped or included with functionally partitioned application tasks in the interface computer and uses the multitasking operating system of the interface computer in the same manner as the application tasks.

The remote diagnostic and monitoring system and method of the present invention further comprises a service remote diagnostic task which runs on the remote service computer and uses the multi-tasking operating system thereof to display screen images received from the interface computer via the communication link and to transmit commands entered by a person at the remote service computer through the communication link to the interface computer for running on the operation system. A screen display packing/unpacking algorithm together with logic operations are employed so that only screen display changes are actually transmitted thereby allowing screen updates on the interface computer to be seen at the distant remote service computer on a real time basis.

The operating system of the interface computer and the remote service computer include alternate virtual consoles which are provided by the operating system software. The remote diagnostic and monitoring system and method of the present invention has the ability to manipulate the virtual consoles and to inject commands on the different virtual consoles. The system and method also provides a conversation window function whereby each display on the interface computer and the remote service computer is divided into two areas, one to display the message being inputted at its computer and the other to display the message being inputted at the other computer, so that persons at the respective computers can communicate with each other by inputting messages or the like on their respective keyboards and visually observing on their respective displays the communication from the other person.

As a result, the system and method of the present invention enables technical experts at the remote location of the supplier/manufacturer of the operation system to provide ongoing support for personnel at the site of the operation system including remote monitoring of the operation system and remote diagnosis of any problems occuring in the operation system.

The foregoing and additional advantages and characterizing features of the present invention will become clearly apparent upon a reading of the ensuing detailed description together with the included drawing where:

BRIEF DESCRIPTION OF THE DRAWINGS

FIGS. 5–9 are diagrammatic views illustrating successive displays occurring during a monitoring procedure performed by the system of FIG. 1;

DETAILED DESCRIPTION

Figure 1:
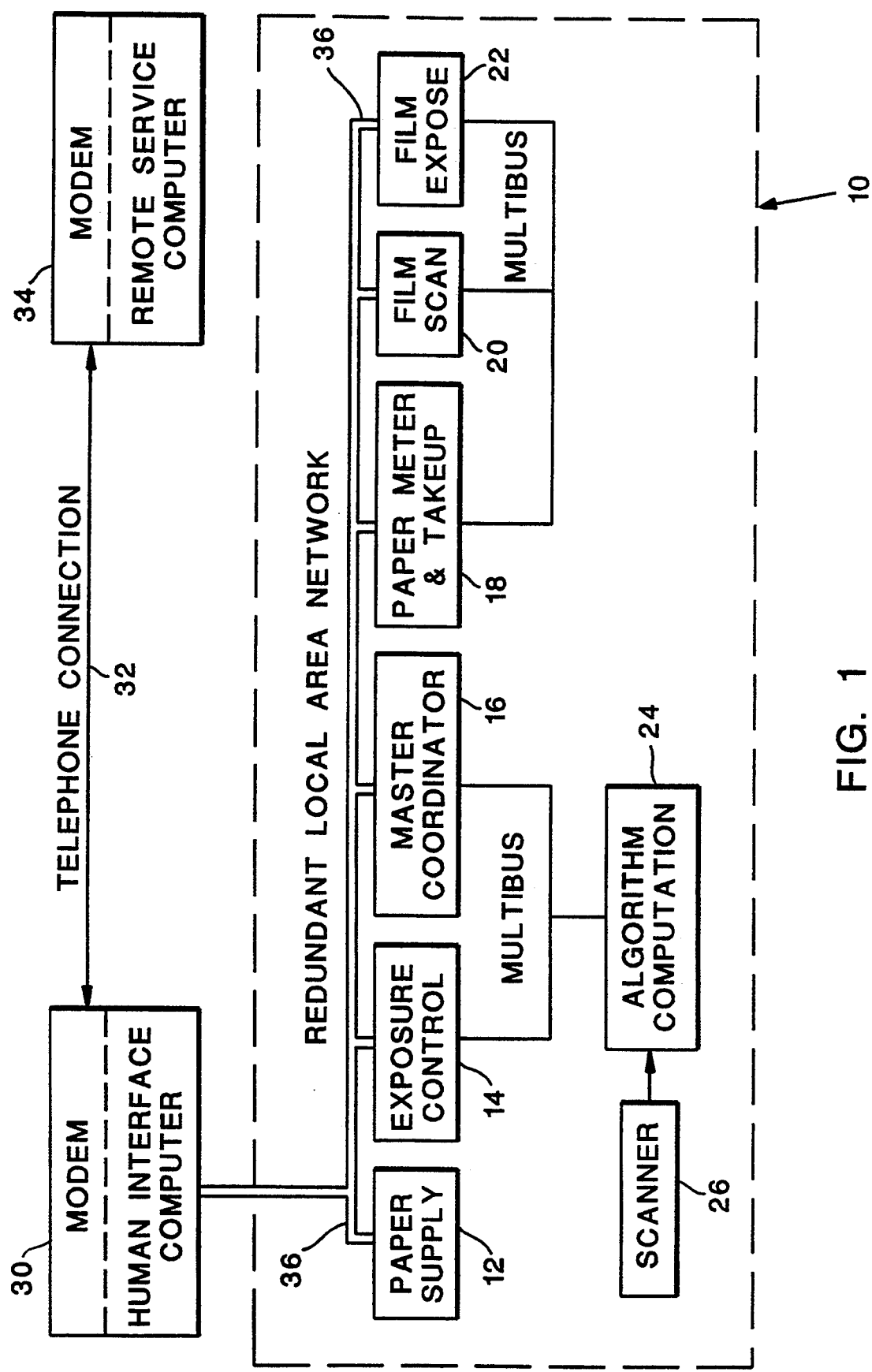
FIG. 1 is a block diagram of the remote diagnostic and monitoring system of the present invention.

The remote diagnostic and monitoring system of the present invention is illustrated generally in FIG. 1 and is for use with an operation system 10 which performs functions to be monitored and controlled. Operation system 10, generally speaking, is any machine or process requiring a flexible, multi-tasking human interface to a real-time control system. In the present illustration, operation system 10 is a photofinishing machine in the form of a photographic printer which automatically produces correctly exposed color prints from negative film. Briefly, printer 10 performs a number of operations at a high rate of speed including positioning film, scanning film, calculating the exposure, adjusting light intensity, positioning paper, exposing film onto the paper, taking up film, taking up paper, recording photographic data and servicing operator commands. These and other operations are controlled by a plurality of dedicated microprocessors such as those designated 12, 14, 16, 18, 20, 22 and 24 in FIG. 1. Each of the microprocessors is associated with sensors to receive information, such as scanner 26, and each of the microprocessors provides outputs to control mechanisms. An example of a photographic printer of this general type is found in U. S. Pat. No. 3,937,573 issued Feb. 10, 1976 entitled "Exposure Control Apparatus For Photographic Printers" and assigned to the assignee of the present invention.

The remote diagnostic and monitoring system of the present invention comprises a remote diagnostic task operating in a human interface computer 30 operatively connected to system 10 and located proximate thereto, a transmission link 32 and a remote service computer 34 coupled to computer 30 via link 32. In the present illustration computer 34 is located on the premises of the supplier, i.e. manufacturer, of operation system 10 so that technical experts at the remote location can provide ongoing support for personnel at the site of operation system 10 including remote monitoring of system 10 and remote diagnosis of any problems occuring in system 10. Also in the present illustration, interface computer 30 communicates with the microprocessors in operation system 10 through a local area network 36. In the present example where operation system 10 comprises a photographic printer, human interface computer 30 provides guidance and controls for human operators to run the printing operation, provides known procedures and guidance for setup, testing and maintenance, stores set up and history information on hard disks, loads microcode over network 36 to the microprocessors at power up, provides extensive diagnostic procedures, provides an interface between printer 10 and communications link 32 and computes exposure algorithm parameters to control the operating center of printer 10. Within this framework, the remote diagnostic task operating on the human interface computer 30 provides the ability to initiate and monitor any of these procedures and controls from a remote location. Transmission link 32 comprises a modem 40 operatively connected to interface computer 30, a telephone line 42 connected at one end to modem 40 and another modem 44 connecting the other end of line 42 to remote service computer 34.

Figure 2:
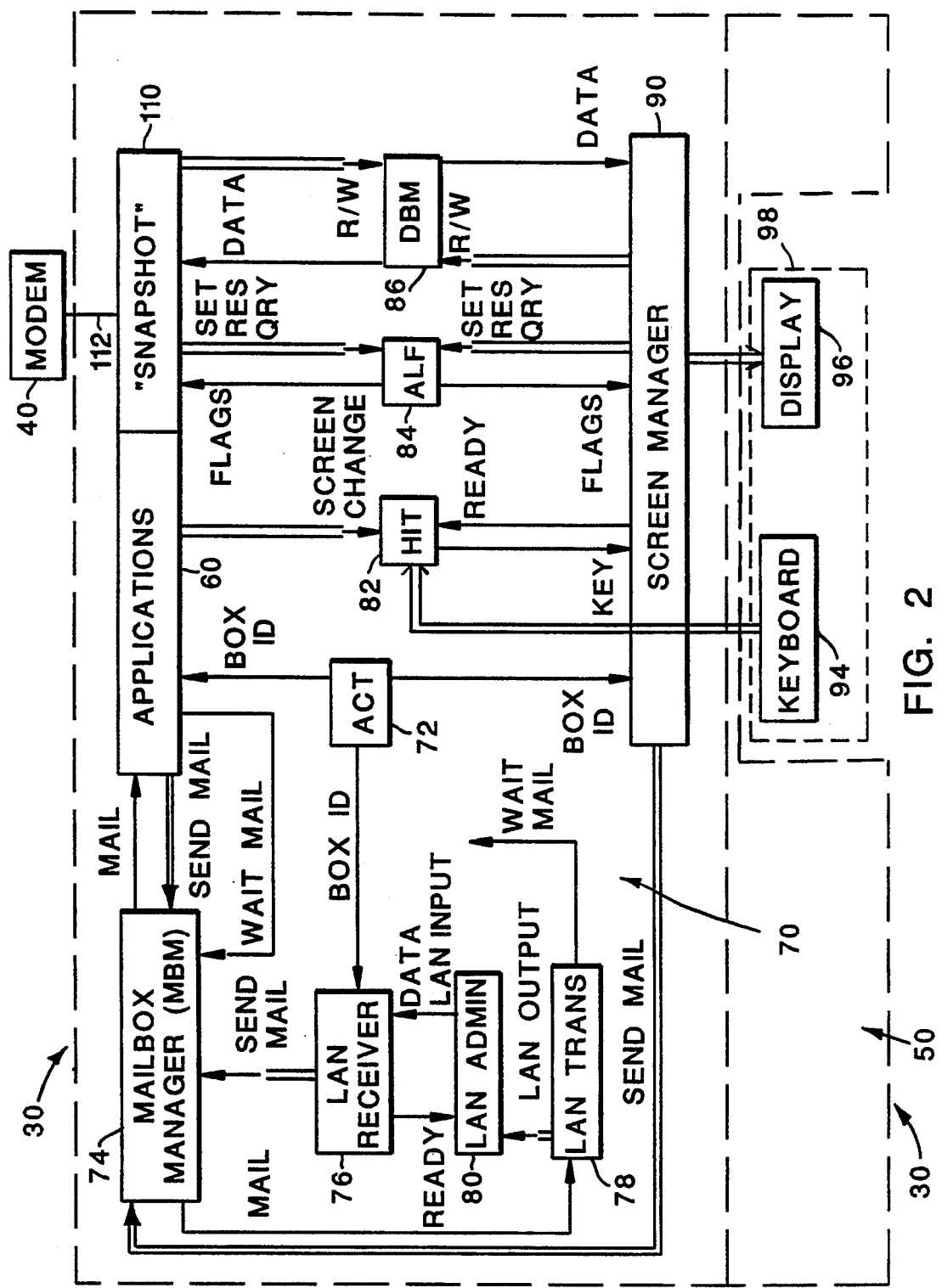
FIG. 2 is a schematic block diagram of the human interface computer in the system of FIG. 1.

FIG. 2 illustrates human interface computer 30 in further detail. It includes a multitasking operating system 50 and therefore supports simultaneous printing and user control. Because the remote diagnostic and monitoring system and method of the present invention is for use with a multi-tasking system, it is believed that a brief description of the structure and operation of human interface computer 30 will be useful in understanding aspects of the present invention.

Computer 30 may receive and respond to up to five input sources at the same time. These include touch screen and keyboard inputs from the human operator, a serial port connection to modem 40 for the remote diagnostics and monitoring provided by the present invention, a densitometer serial port connection for the input of photographic data and the connection to local area network 36 for communication with the microprocessors for printing data and control information. In FIG. 2 the double lines represent paths for "send" messages and the single lines represent paths for "reply" messages. Interface computer 30 further includes means generally designated 60 for providing a plurality of functionally partitioned application tasks. By way of illustration, the application tasks either focus on response to one area of printer 10 such as film, paper and exposure or they provide co-ordination between separate components and the user for overall operation such as automatic printing, initialization, power failure and diagnostics or they store and report data such as error handling and history tasks. All the application tasks are reply blocked waiting for mail.

The remainder of human interface computer 30 is an applications support system generally designated 70 which provides data handling and communications. Thus, computer 30 comprises the three main components: functionally partitioned application tasks 60, multitasking operating system 50 and application support system 70. The application support system 70 provides a stable interface to the world for application tasks 60, and each of the application support tasks shown in FIG. 2 is in effect a reusable extension to the operating system 50. In particular, the support task 72 designated ACT is the administrator that provides a look up function for message destinations, and the support task 74 designated MBM is the mailbox administrator. Through the use of the mailbox, resource/sending task are not reply blocked. The LAN Receiver, LAN Transmitter and LAN Administrator application support tasks designated 76, 78 and 80, respectively, provide the interface to the hardware of local area network 36 for communication to and from the microprocessors. The support task 82 designated HIT is an administrator which provides input processing for a screen manager support task which will be described. Support task 84 designated ALF is an administrator which services the set of status information needed by more than one task, and support task 86 designated DBM is a database administrator for information on setup parameters and history. The screen manager task 90 uses a screen sequence database and screen description files to change displays on command from the user or by an application task.

The application support task ACT 72 and MBM 74 co-operate such that the actual destination of each message is transparent to the sender. In particular, ACT 72 is the initial task, and when it starts it creates all the other tasks, and assigns each one an absolute mailbox identification, i.e. Box ID indicated in FIG. 2. ACT 72 contains a table which matches signal numbers to task or microprocessor destinations. Every communication in computer 30 has an identifying signal number as the first part of the message. When the application tasks 60 or LAN Receiver 76 or screen manager 90 send mail, that function retrieves from ACT 72 the absolute mailbox ID of the destination based on the signal number. Then the "send mail" message is completed to MBM 74 which puts the message in the destination mailbox and returns an immediate reply.

When processing for an event is completed, the application tasks 60 and LAN Transmitter 78 call the "wait mail" function and are reply blocked on MBM 74. Similarly, when LAN Receiver 76 has sent mail to MBM 74 it sends a "ready" message to LAN Administrator 80 and is reply blocked. In addition, the screen manager 90 is reply blocked on HIT 82 after it completes each screen processing event. HIT 82 also provides communication transparency to screen manager 90. In particular, inputs from modem 40, a keyboard 94, the touch screen of a display 96 and application tasks 60 are translated to the form of keyboard inputs by HIT 82, and then are passed to screen manager 90 when the latter is ready. Keyboard 94 and display 96 together comprise a console 98.

The foregoing provides application support communications. ALF 84 and DBM 86 provide the data handling portion of the application support system. In particular, ALF 84 provides fast retrieval and update for control status information used by multiple tasks covering such things as printer power state, film and paper readiness and automatic printing state. The screen manager 90 and application tasks 60 may query, set or reset these status conditions. DBM 86 provides a relational database for setup parameters and printer history. Data may be accessed for display by the screen manager 90 and at the same time may be accessed for read/write by an application task 60. Each database is associated with one task which has update responsibility for that database. Each time an application task does a database write, that function call changes the database and then sends a message to HIT 82 with the database name. If that database is currently displayed, the screen manager 90 is signalled to reprint the screen with the new data. The screen manager task has write responsibility for data which is entered by the user. When the entry of data by the user requires further processing, then the completion of data entry is an event which is sent to the appropriate application task 60. The application task 60 then accesses the database to complete its response.

As a result of the foregoing, the application tasks 60 receive data and control messages from the user after they are fully checked and validated. Simple data or control transfers to and from the user are handled by the screen manager 90. The application tasks 60 become involved only when extended calculations or microprocessor extended time interactions are required. The application tasks 60 are insulated from input/output timing constraints, input validation overhead and system co-cordination conflicts by the application support system 70. The support system 70, in turn, is largely insulated from changes in functional specifications of printer 10. The bulk of the printer specific information is either in the application tasks 60 or in the database.

The foregoing is illustrated further by the following example of a communication from microprocessors to human interface computer 30. The computer screen would include in one display a heading "Paper Takeup" and under that a box indicating "Paper Status". If the person operating printer 10 were to remove a paper cassette, the screen would require update while being displayed. A signal would enter human interface computer 30 through local area network 36 from the microprocessor 12 where the cassette removal was sensed. Lan Receiver 76 issues a "Send Mail" message which retrieves the destination mailbox from ACT 72 and then deposits the message in the identified mailbox. The data then would be retrieved by the "Paper" application task. The application task then does a database write to save the new paper conditions. The write function causes the screen change message to go to HIT 82. Since the database values are being displayed, HIT 82 will prompt the screen manager 90 which retrieves the new data values and updates the screen. The resulting screen image shows dashed lines indicating no cassette at the particular location.

The remote diagnostic and monitoring system and method according to the present invention is for use with any machine or process requiring a multi-tasking interface to a real-time control system. Accordingly, the foregoing description of human interface computer 30 is believed to elucidate the multi-tasking environment in which the present invention is employed.

In accordance with the present invention, a separate, additional task 110 is grouped or included with the functionally partitioned application tasks 60 and utilizes the services of operating system 50 in the same manner as the tasks 60. The remote diagnostics task 110 runs on operation system 10 and, using the services of multitasking operating system 50, provides for the transmission of screen images out to transmission link 32 in the form expected at remote service computer 34. Task 110 also provides for the injection of commands from remote service computer 34 into the input processing task of operation system 10, i.e. into one of the tasks 60, in such a way that the remote source, i.e. computer 34, is transparent to that input processing task. A serial port connection 112 provides communication between task 110 and modem 40.

Thus, the remote diagnostic function provided by the present invention creates a separate task 110 which runs in parallel with the operation product software, i.e. the software for running the machine or process comprising operation system 10. The remote diagnostic task 110 receives instructions from a person at remote service computer 34 through the transmission link 32 and injects these instructions into the operating software of system 10 in such a way that the remote source, i.e. computer 34, is indistinguishable from a local source. The remote diagnostic task detects which portion of the operation system 10 is controlling the console 98 at the moment in which the command is received and sends the command received from the remote site to that active portion of the operation system 10. The key feature of this aspect of the present invention is that the remote operation effects no change in the behavior of the system 10 under test due to the source of the instruction. That is because the remote diagnostic task 110 is grouped or included with the functionally partitioned application tasks 60 and uses the multitasking operating system 50 in the same manner as the application tasks 60. Also transparent to the system 10 under test, the remote diagnostic task 110 sends the display on human interface computer 30 back to remote service computer 34 on a real time basis. A screen display packing/unpacking algorithm, which will be described, is employed so that only screen display changes are actually transmitted, allowing screen updates on interface computer 30 to be seen at the distant remote service computer 34 with minimal delay. The person at the remote location interfaces to the transmission link 32 through a computer 34 which is identical to human interface computer 30 on the operation system 10. Thus the person viewing the display on remote service computer 34 sees an exact duplicate of the display on computer 30 at the operation site.

Figure 3:
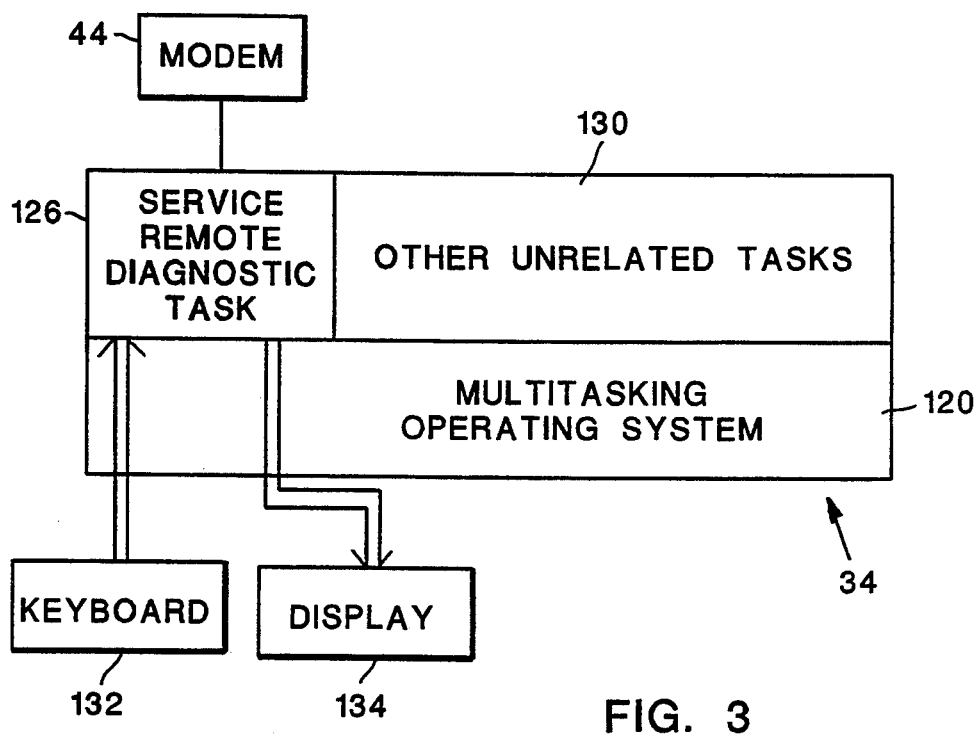
FIG. 3 is a block digram of the remote service computer in the system of FIG. 1.

FIG. 3 illustrates remote service computer 34 in further detail. As previously described, computer 34 is at a location distant or remote from operations system 10, and in the illustrative example where system 10 is a photographic printer located at a photofinishing plant, remote service computer 34 is located on the premises of the manufacturer or supplier of printer 10. Also as previously described, remote service computer 34 is identical to human interface computer 30 so that the display on computer 34 is an exact duplicate of the display on computer 30. As shown in FIG. 3 remote service computer 34 includes, briefly, a multi-tasking operating system 120 with communications protocol and which is identical to multi-tasking operating system 50 in computer 30. The communications protocol is used for sending and receiving files across a modem connection between the operating system based on computers 30 and 34 as will be described.

In accordance with the present invention, a service remote diagnostic task 126 is provided which runs on computer 34 remote from operation system 10 which, using the services of multi-tasking operating system 120, provides for the display of the screen images from operation system 10 through the modem 44 and provides for transmission of commands entered by the service person via computer 34 through transmission link 32 to operation system 10. In a manner similar to that of human interface computer 30, remote service computer 34 includes a plurality of additional tasks 130 which also utilize the services of operating system 120. These additional tasks 130, however, are unrelated to service remote diagnostic task 126. As shown in FIG. 3, computer 34 is provided with a keyboard 132 for inputting the commands previously described and a display 134 for viewing screen images received from interface computer 30 as previously described. A serial port connection 138 provides communication between task 126 and modem 44.

Figure 4:
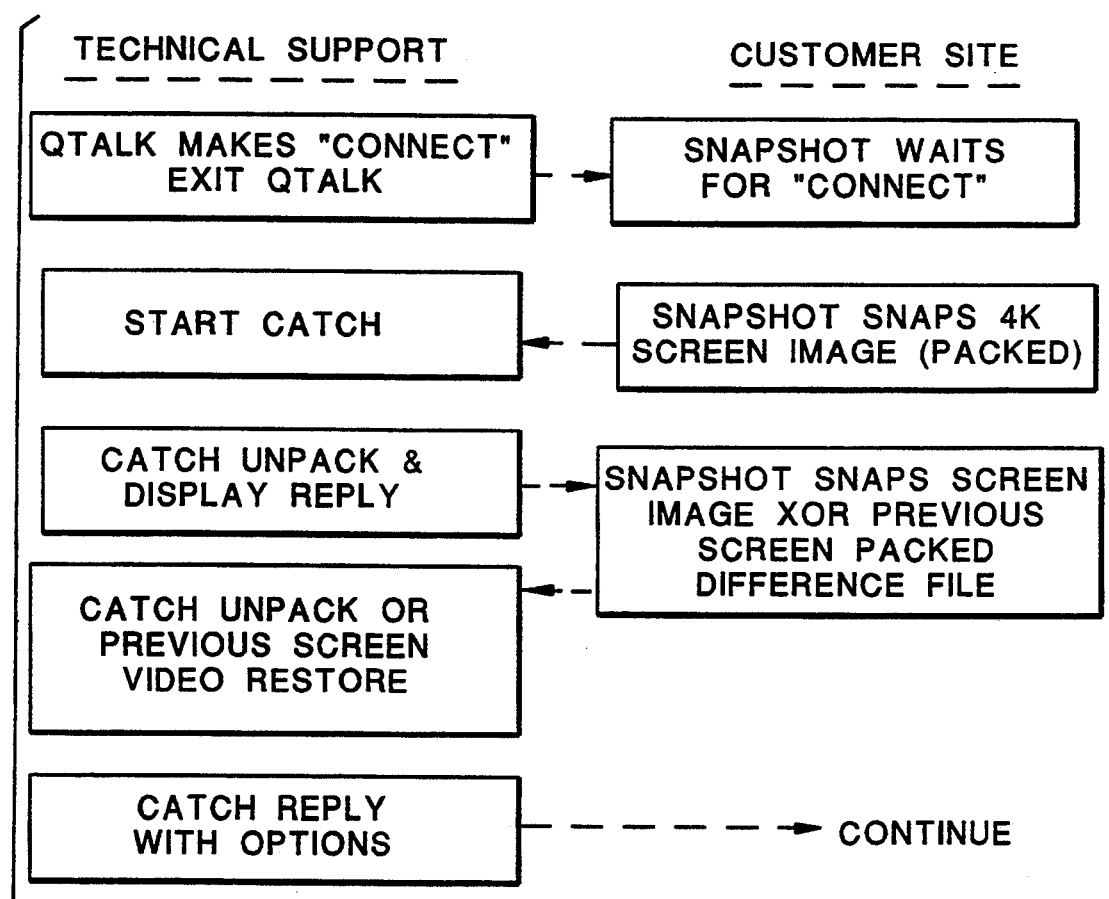
FIG. 4 is a flow diagram illustrating aspects of operation of the system of FIG. 1.

The remote diagnostic and monitoring system and method according to the present invention provide an effective solution to the difficulties in training support personnel for complex operation systems like photographic printer 10. The system and method of the present invention allow experienced people at the manufacturer/supplier location to provide ongoing support for personnel at the operation system site during the entire life of the system. The first step at the operation system location is to connect modem 40 to the system serial port 112 and configure the modem 40 for an auto answer mode. Then the baud rate and other parameters for modem 40 through a standard input screen. After telephone contact has been made to arrange for the communications link, the person at the operation system location simply touches an enable target on the screen of human interface computer 30. When this happens, remote diagnostics task or program 110 is started in the background. In the illustrative situation where operation system 10 is a photographic printer, this program is designated "Snapshot". At the manufacturer/supplier remote location, the technical expert initiates the telephone call using a communications protocol package associated with operating systems 50,120. As soon as the connection is made, the stand alone human interface at the manufacturer/supplier location, i.e. remote service computer 34, exits the communication protocol and starts the service remote diagnostic task or program 126. In the illustrative situation where operation system 10 is a photographic printer, this program is designated "Catch". After the initial full screen image is transmitted, then for each screen refresh only the differences are sent. With each reply the "Catch" program also services and transmits commands entered by the technical expert in the remote service computer 34. The foregoing is summarized in the flow diagram of FIG. 4 where "CONNECT" designates the connection made via communications line 32, qtalk is the communications protocol and XOR represents a process including exclusive OR logical operations forming a part of the packing/unpacking algorithm which will be described.

By means of the above-mentioned commands, the technical expert at the manufacturer/supplier remote location can use the operating systems communications protocol to send or retrieve files, activate a conversation mode for 2-way communication with a person at the operation system 10, or operate the system 10 by injecting key commands through keyboard 132 of remote service computer 34. This is all possible because the program, for example "Snapshot", runs as a background task which is transparent to the normal software of operation system 10. Thus the technical expert at the manufacturer/supplier remote location can view database files, run and monitor diagnostics, look at results of tests on the output of operation system 10 such as photographic test results, and update program or database files at any location in a quick and easy manner. Furthermore, the following functions require no activity at the location of operation system 10: verification of code and data content, delivery of product software updates, retrieval of operational history files for analysis at the manufacturer/supplier location and adjustment of user data for improved performance. In addition, with the assistance of service personnel at the site of operation system 10, remote operation capability also is provided. The technical expert at the manufacturer/supplier location can operate diagnostics or actual production on operation system 10 and observe the data results on operation system 10 in real time. Through an on line conversational feature which will be described, the service person at operation system 10 can add physical observation with respect to system operation.

Figure 5:
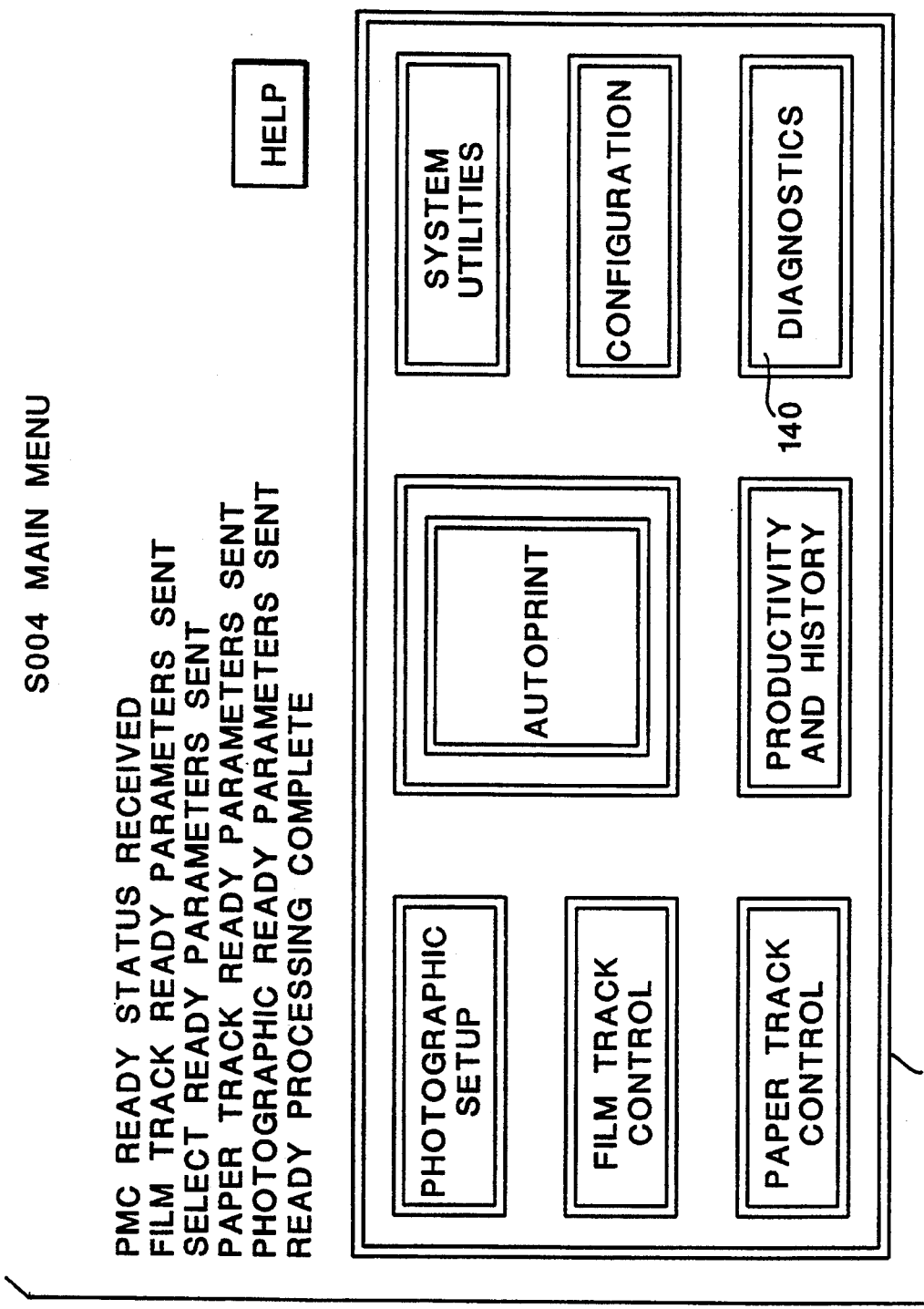
Figure 6:
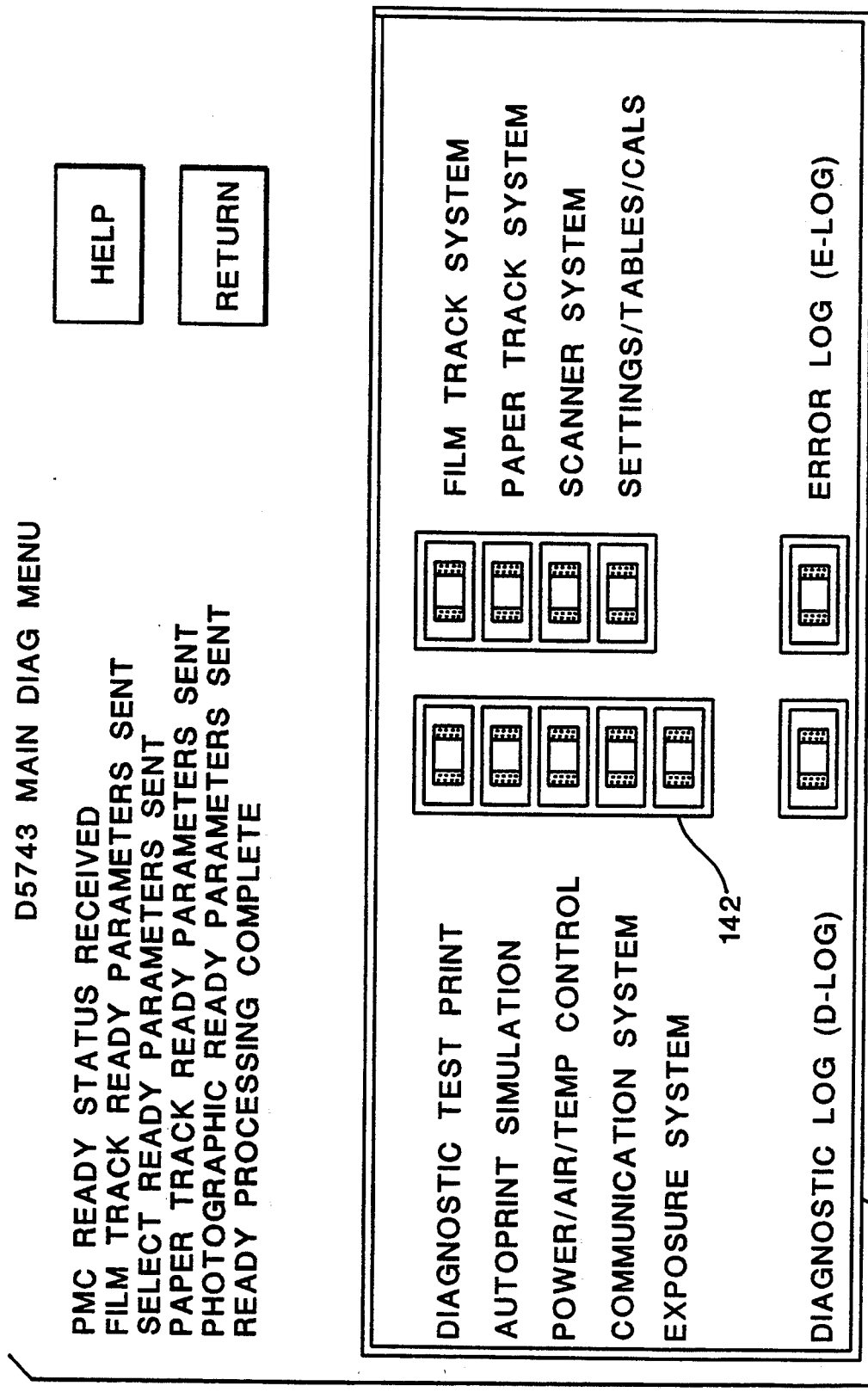
Figure 7:
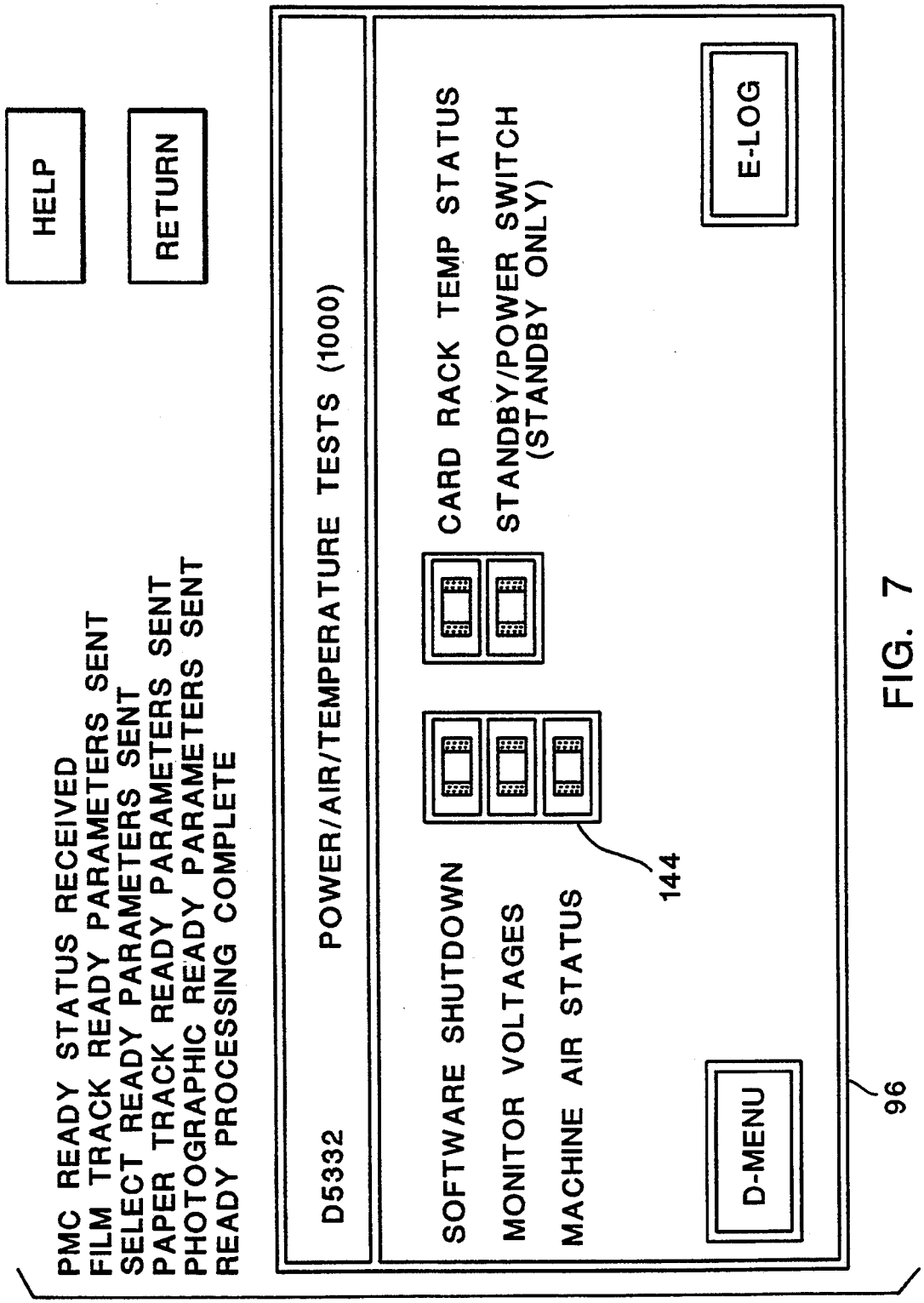

The foregoing is illustrated further by the following example of a monitoring procedure initiated at remote service computer 34 for observing changes in an operating parameter of system 10. In particular, the parameter monitored is power supply voltages where operating system 10 is a photographic printer as previously described. FIG. 5 illustrates the screen image seen on display 96 of human interface computer 30 when the main menu is called up. By touching the area 140 labelled "DIAGNOSTICS" the user initiates the diagnostic mode whereupon the next screen image seen on display 96 sets out the various diagnostic options as shown in FIG. 6. Since it is desired to monitor the power supply voltages, block 142 designated "POWER/AIR/TEMP/CONTROL" is touched. This changes the image on display 96 to that shown in FIG. 7 which provides a breakdown of the various available tests. Block 144 designated "MONITOR VOLTAGES" is touched whereupon the image on display 96 is changed to that shown in FIG. 8. At this point the system is in the diagnostics mode. The area 146 designated "START TEST" is touched whereupon monitoring of the power supply voltages in operation system 10 takes place. FIG. 9 shows the screen image on display 96 which presents data from the various tests being performed, in particular the voltages on the various power supplies indicated. In accordance with the present invention, the display in FIG. 9 also is provided on display 134 of remote service computer 34 and in real time. In other words, as the voltage values shown in FIG. 9 change due to changing conditions in the power supplies of operation system 10, the corresponding voltage values change on display 134 of remote service computer 34 with minimal delay. That is because a screen display packing/unpacking algorithm is employed so that only screen display changes are actually transmitted in a manner which will be described.

By way of example, in an illustrative system and method, operation system 10 is a CLAS 35 photographic printer available from Eastman Kodak Company, modems 40 and 44 both are internal modems available from Microcom Inc. under the designation AXPC9624C, computers 30 and 34 both are Hewlett Packard type HPES12, and multitasking operating systems 50 and 120 are available from Quantum Software Systems Ltd., Kanata, Ontario, Canada under the designation QNX.

Figure 10:
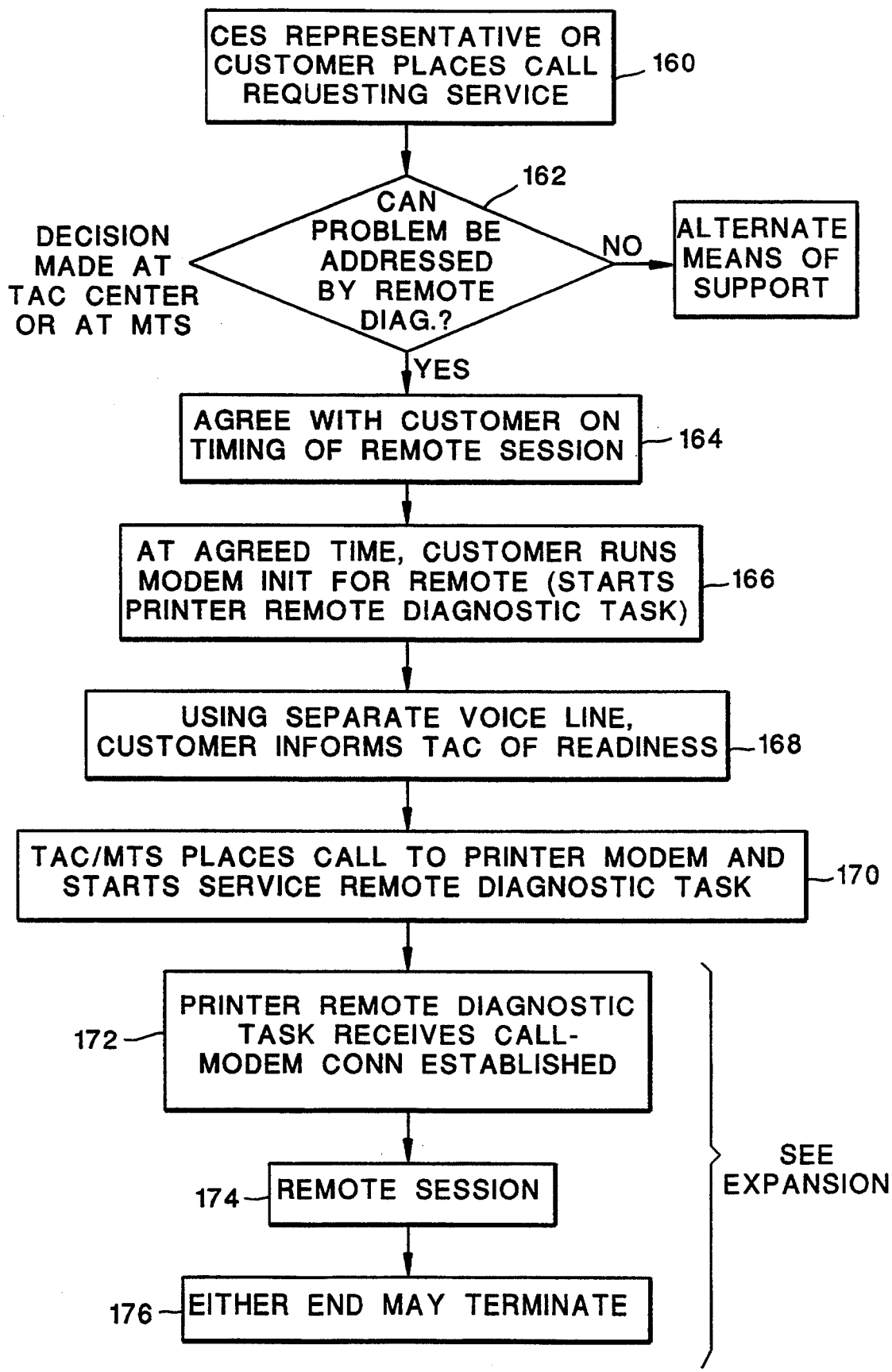
FIGS. 10–21 comprise a program flow chart illustrating operation of the remote diagnostic and monitoring system and method of the present invention.

FIGS. 10-21 comprise a program flow chart which further illustrates the remote diagnostic and monitoring system according to the present invention. In particular, FIG. 10 is a summary of the overall procedures carried out during the program. As indicated in block 160, a supplier representative or the customer at the location of operation system 10 requests service by telephone whereupon a decision 162 is made at the manufacturer/supplier location whether the problem can be handled by the remote diagnostics system and method. In particular, the system and method can be used to solve setup and calculation data problems, run component diagnosis and analyze results, look at error trends, look at productivity and usage, look at power supply voltages and look at static sensors. It is not used for more complex hardware problems. Assuming the problem can be addressed by the system and method, agreement is reached on the time at which the remote diagnostic and monitoring session is to occur as indicated in block 164. Modem configuration occurs in block 166 and will be described. In blocks 168,170 TAC/MTS represents the technical expert or engineer at the manufacturer/supplier site who performs the remote diagnosis and monitoring. Blocks 172 and 174 are illustrated in subsequent portions of the flow chart, block 174 representing the entire remote diagnostic and monitoring procedure. Block 176 indicates that the procedure may be terminated either at the operation system 10 end or at the manufacturer/supplier site.

Figure 11:
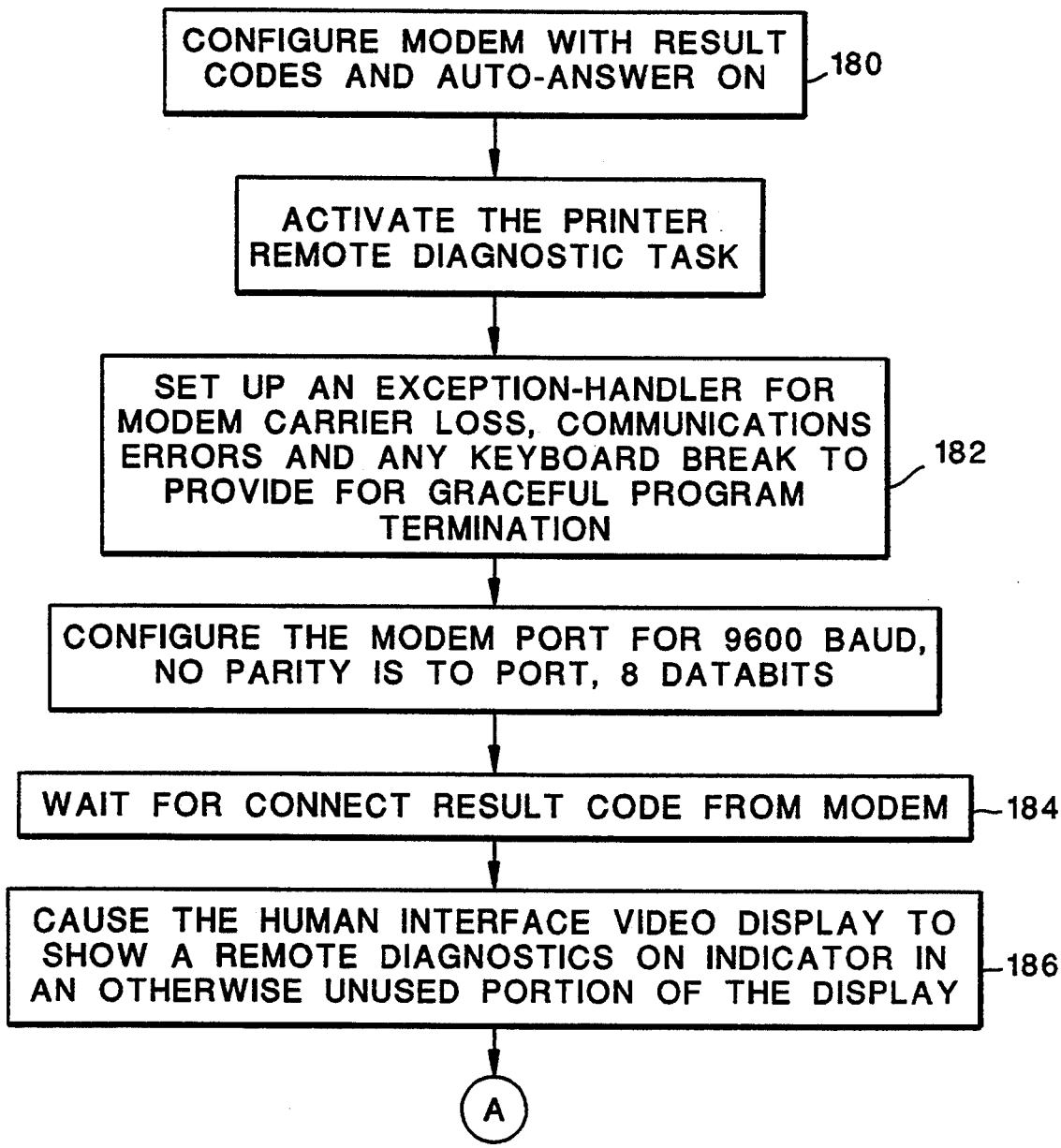
Figure 12:
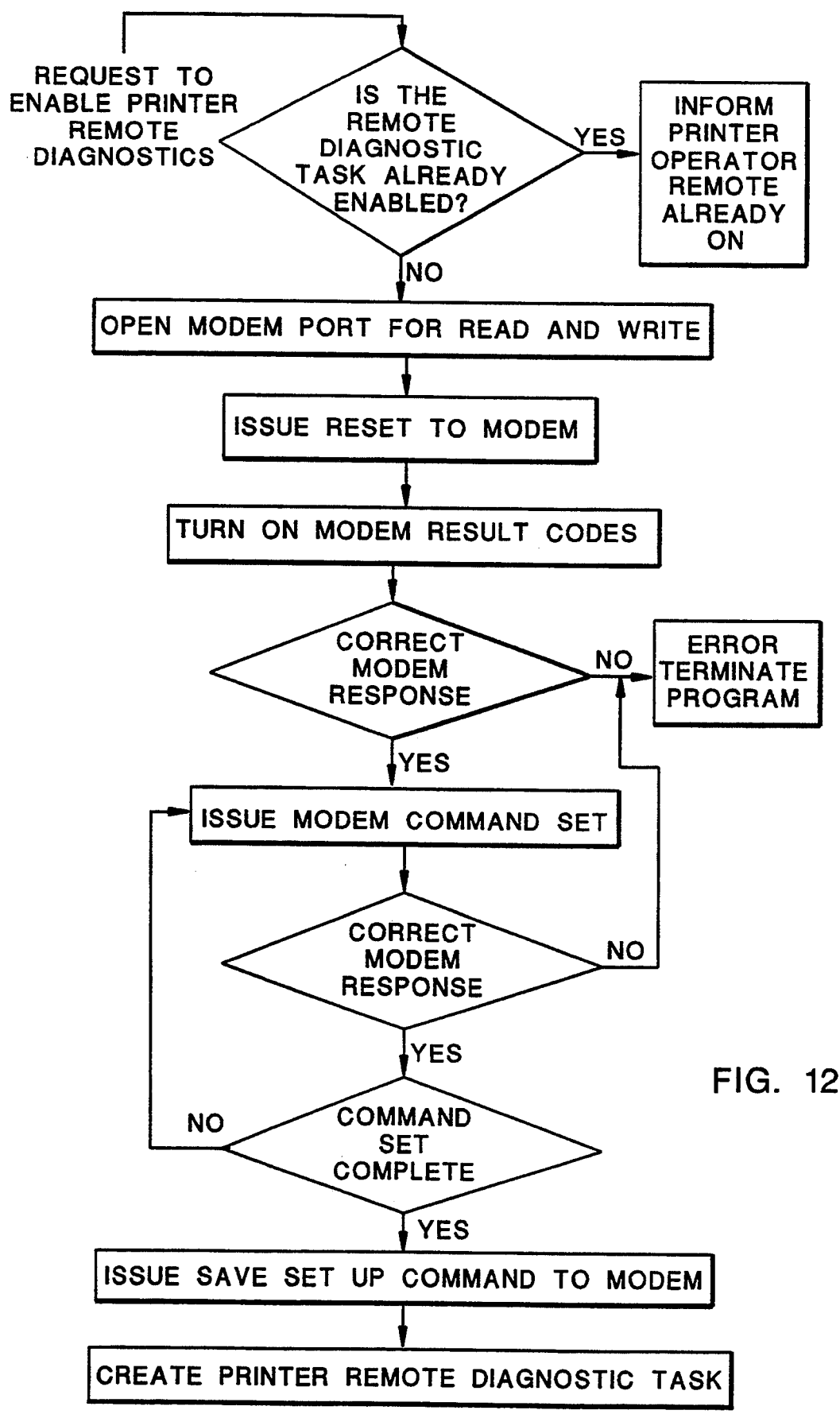

FIGS. 11-16 illustrate operation of the program in human interface computer 30 proximate the operation system 10. Referring to FIG. 11, block 180 represents the configuration of modem 40 and this amplified in FIG. 12. The configuration steps illustrated in FIG. 12 are for the illustrative Microcom AXPC9624C modem. The modem command set for the Microcom AXPC9624C is "ATE1 GO \\ N2S0=1\\J1\\Q0\\X-O\\K552=43", "ATV1\\VO-\\EO\\TO%E1%C1%P2%Z1\\A3\\CO%AO", "AT\\H0S8=2&D2&C1\\D2\\R1M1& LO&MO&T4X-4&PO", "", Other modems can of course be employed in the system and method of the present invention, and such other modems can be configured readily by persons skilled in the art. Beginning with block 182 in FIG. 11 the remote diagnostic task 110 in FIG. 2 also designated "Snapshot" in FIG. 2, is activated. The CONNECT result code indicated in block 182 of FIG. 11 results when a call has been placed.

Figure 13:
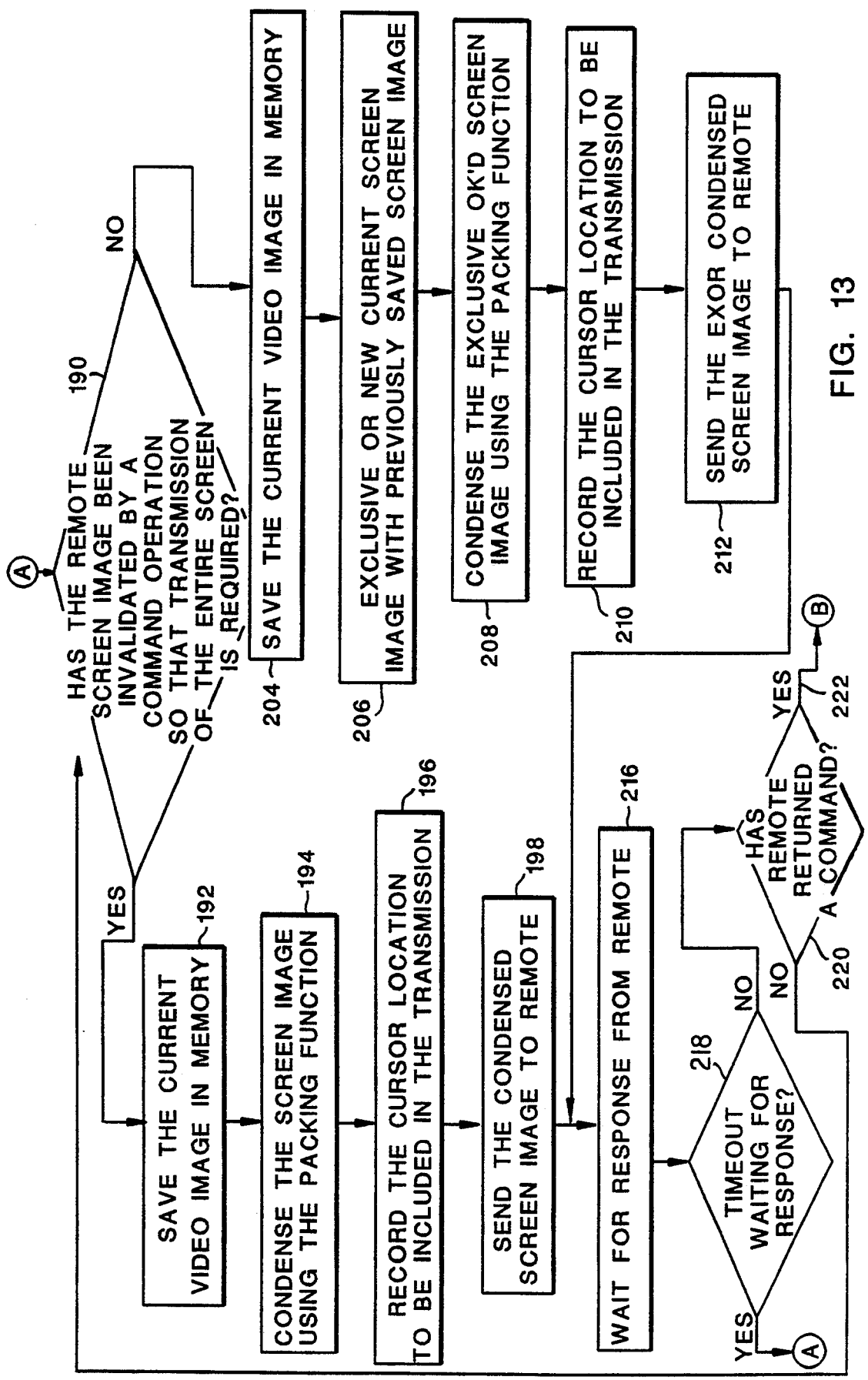

Referring now to FIG. 13, this illustrates the portion of the program which controls transmission of screen images from display 96 of human interface computer 30 to display 134 of remote service computer 34. This portion of the program is accessed from the output of block 186 in the portion of FIG. 11. The operation proceeds from the input through decision block 190 always to the left as viewed in FIG. 13 in either of the following situations. The first is during the first transmission of an image on display 96 to display 134. The second is as indicated within block 190, i.e. when a command is issued from remote service computer 34 which has removed, i.e. overwritten, the image on the display 96. This would occur, for example, when remote service computer 34 requests a file from operation system 10 or human interface computer 30 or requests that human interface computer 30 receive a file sent to it from remote service computer 34. In either of the foregoing situations, there is a requirement that the entire screen image on display 96 of human interface computer 30 be transmitted to display 134 of remote service computer 34. The sequence of operations for carrying out this transmission is described in blocks 192,194,196 and 198. The current screen image on display 96 is saved in the memory of human interface computer 30 for a purpose to be described. As indicated in block 194 the screen image is condensed using a packing function which will be described in detail presently.

In all other situations, the operation proceeds from the input through decision block 190 to the right as viewed in FIG. 13, i.e. when the screen image has not been invalidated or overwritten by a command operation. In this mode of operation, only changes in the screen image of display 96 are transmitted thereby allowing screen updates on interface computer 30 to be seen at the distant remote service computer 34 with minimal delay, i.e. on a real time basis. In other words, each time a portion of the screen image changes, i.e. one of the supply voltage values in the example of FIGS. 5-9, only that change is transmitted. The remainder of the screen image which has not changed, i.e. the other supply voltage values, is preserved thereby avoiding the need to transmit it with the resulting time saving. This will be described in further detail presently.

The sequence of operations for carrying out this mode of operation is described in blocks 204,206, 208, 210 and 212. As indicated in block 204, the current image on display 96 is saved in the memory of human interface computer 30. Next, the current image on display 96 is compared with the previously stored image from display 96 in the operation described in block 206. Depending upon the previous mode of operation, the stored image results from either block 192 or block 204. In particular, the stored and current display characters are converted to binary representations and a logical operation is performed which provides one result when the characters are identical and another, different result when the characters are not identical. According to a preferred mode of the present invention the logical operation is Exclusive OR, and this will be illustrated in further detail presently. Next, the screen image on which the logical operation was performed is condensed using a packing function as indicated in block 208 which will be described.

Thus, a screen image is transmitted to remote service computer 34 through either of the two modes of operation illustrated in FIG. 13. As indicated in blocks 216, 218 and 220 the program awaits a response from remote service computer 34. The response is either command or an acknowledge that the message was received. If the response is a command, the program proceeds to the next phase as indicated by path 222, otherwise it returns to the input of decision block 190.

In the packing function indicated in blocks 194 and 208, the video image character buffer in human interface computer 30 is searched and the lowest ASCII value which does not appear as a character is determined. This unused ASCII value is selected as a repeat indicator character for the next transmission of the character buffer. The video image character buffer is searched again, and for any consecutive character repeats of more than four characters a four byte repeat sequence is placed in the transmission buffer of human interface computer 30. The four byte repeat sequence consists of a repeat indicator character, a repeating character and a 2 byte count which will be described in further detail. Any consecutive character repeats of four or less or any non-repeating characters are placed directly into the transmission buffer. In a separate interation the same algorithm is applied to the video image attribute buffer of human interface computer 30. The cursor position and the repeat indicating characters for each transmission are indicated in the message header of the transmission from human interface computer 30.

The foregoing is a description of the packing function which is employed in the human interface computer 30. When the transmission is unpacked at the remote service computer 34, the repeat indicator character given in the afore-mentioned message header is used to identify each occurrence of the four byte repeat sequence and these are expanded in the video display buffer of remote service computer 34 according to the given count. Non-repeating characters are placed directly into the video display buffer. The attribute and character transmissions are remerged in preparation for display at remote service computer 34. The foregoing is a description of the unpacking function which is employed at remote service computer 34.

The foregoing is illustrated further by the following examples. The first example is for the case when the previous screen image and the current screen image are the same, for example the letter A:

| Previous image:A | ASCII value: | 01000001 |
|---|---|---|
| Current image: A | ASCII value: | 01000001 |
| | Exclusive OR result: | 00000000 |

Thus, when there is no difference between the previous and current screen image, the result of the Exclusive OR logical operation applied to the previous and current images will be zero. Furthermore, this result can occur for substantial portions of a line on the display or even for the entire length of the line if there is no difference between previous and current line images. The foregoing logical operations occur in human interface computer 30.

The Exclusive OR result, in this example a one byte value of zero, is then packed for transmission using the previously described packing function. An N length series of adjacent unchanged characters would result in the following four byte repeat sequence:

Rep 0 N count where Rep is the repeat indicator character (lowest ASCII value which does not appear as a character), 0 is the repeating character, in this case zero, and Ncount is count or number of unchanged characters.

When the packed transmission is received at remote service computer 34, it is unpacked to provide the sent or transmitted characters, which is the previous Exclusive OR result, i.e. for this example a one byte value of zero for each unchanged character. An Exclusive OR operation is applied to each unpacked transmitted character and its corresponding previous image representation to provide a result which is the current image for that character, i.e. for the letter A:

| Previous image | (ASCII value of A): | 01000001 |
|---|---|---|
| Sent character | (ASCII value): | 00000000 |
| | Exclusive OR result: | 01000001 |

Thus, the letter A in the screen image on human interface computer 30 appears in the screen image on remote service computer 32. Furthermore, this was accomplished by transmitting only four bytes of information for each series of adjacent unchanged characters through transmission link 32. When this is employed for substantial portions of the screen area which have not changed between previous and current images, the saving in transmission time is readily apparent.

The second example is for the case when the previous screen image and the current screen image are different, for example the letters A and B, respectively:

| Previous image: A | ASCII value: | 01000001 |
|---|---|---|
| Current image: B | ASCII value: | 01000010 |
| | Exclusive Or result: | 00000011 |

Thus, when the previous and current screen images for a single character in human interface computer 30 are different, the result of the Exclusive OR logical operation applied to the previous and current images will result in a non-zero single byte result. Unless this non-zero result is adjacent to another identical non-zero Exclusive Or result, it will be transmitted as a non-repeating character.

When the transmission is received at remote service computer 34, after unpacking any repeating series as in the above example, the non-repeating character which is the previous Exclusive 0R result representing the changed character, i.e. 00000011, is combined with the corresponding previous image representation using the Exclusive Or operation to provide a result which is the current image, i.e. the letter B:

| Previous image | (ASCII value of A): | 01000001 |
|---|---|---|
| Sent character | (ASCII value): | 00000011 |
| | Exclusive Or result: | 01000010 |

Thus, the letter B in the screen image on human interface computer 30 appears in the screen image on remote service computer 34.

The portion of the program illustrated in FIG. 13 thus causes only screen display changes to be transmitted in the one direction from human interface computer 30 to remote service computer 34. This allows screen updates to be seen on remote service computer 34 with minimal delay, i.e. substantially on a real time basis. This is particularly advantageous in monitoring rapidly changing parameters, such as the supply voltages in the example of FIGS. 5–9.

As previously described in connection with FIG. 13, if remote service computer 34 returns a command, the program proceeds to the portion illustrated in FIG. 14, in particular to the input of decision block 240. At this point, it is determined whether remote service computer 34 has requested to open a conversation window. In accordance with the present invention, a conversation window is a boxed area visually overlayed on the current video image in display 96 of human interface computer 30 and in display 134 of remote service computer 34. All keyboard inputs and modem inputs are routed to the conversation window program while it is active, and this is done by the respective operating systems 50 and 120. As a result, other programs do not get the keyboard inputs. Function keys are used to send audible beeps, clear areas of the conversation window and terminate the conversation window program all in a manner which will be described.

Figure 22:
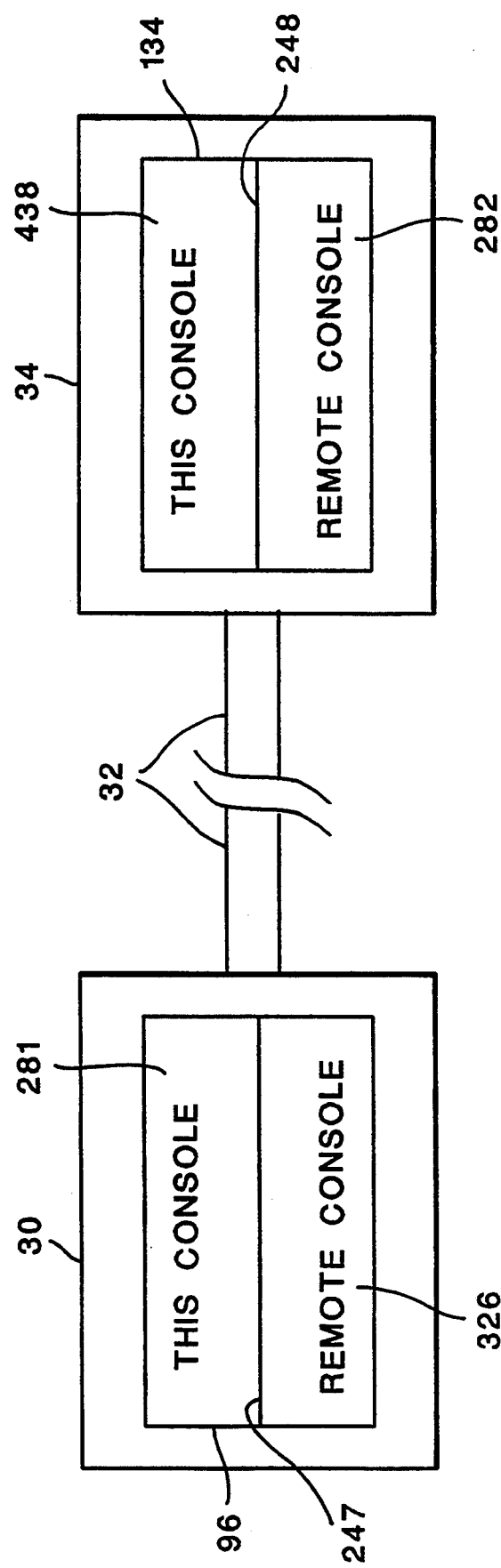
FIG. 22 is a block diagram illustrating an aspect of the system and method of the present invention.

If there has been a request from remote service computer 34 to open a conversation window, the current video image is saved as indicated in block 242, the conversation window is displayed as indicated in block 244 and the program proceeds to the portion for carrying out the conversation window function as indicated by path 246. This function will be described in detail presently. The display of the conversation window can take various forms. For example, according to a preferred mode of the present invention each display 96 and 134 of human interface computer 30 and remote service computer 34, respectively, would be separated by a horizontal line image dividing each screen into upper and lower portions of substantially equal area, i.e. lines 247 and 248 shown in FIG. 22. The upper area on each screen would display in alphanumeric form whatever message, command or other communication is being inputted on the keyboard associated with that display. The lower area on each screen would display in alphanumeric form whatever message, command or other communication is being received over the modem link after having been inputted on the keyboard associated with display on the remote computer. Thus, persons at the respective computers 30 and 34 can communicate with each other by inputting messages or the like on their respective keyboards and visually observing on their respective displays the communication from the other person.

Figure 14:
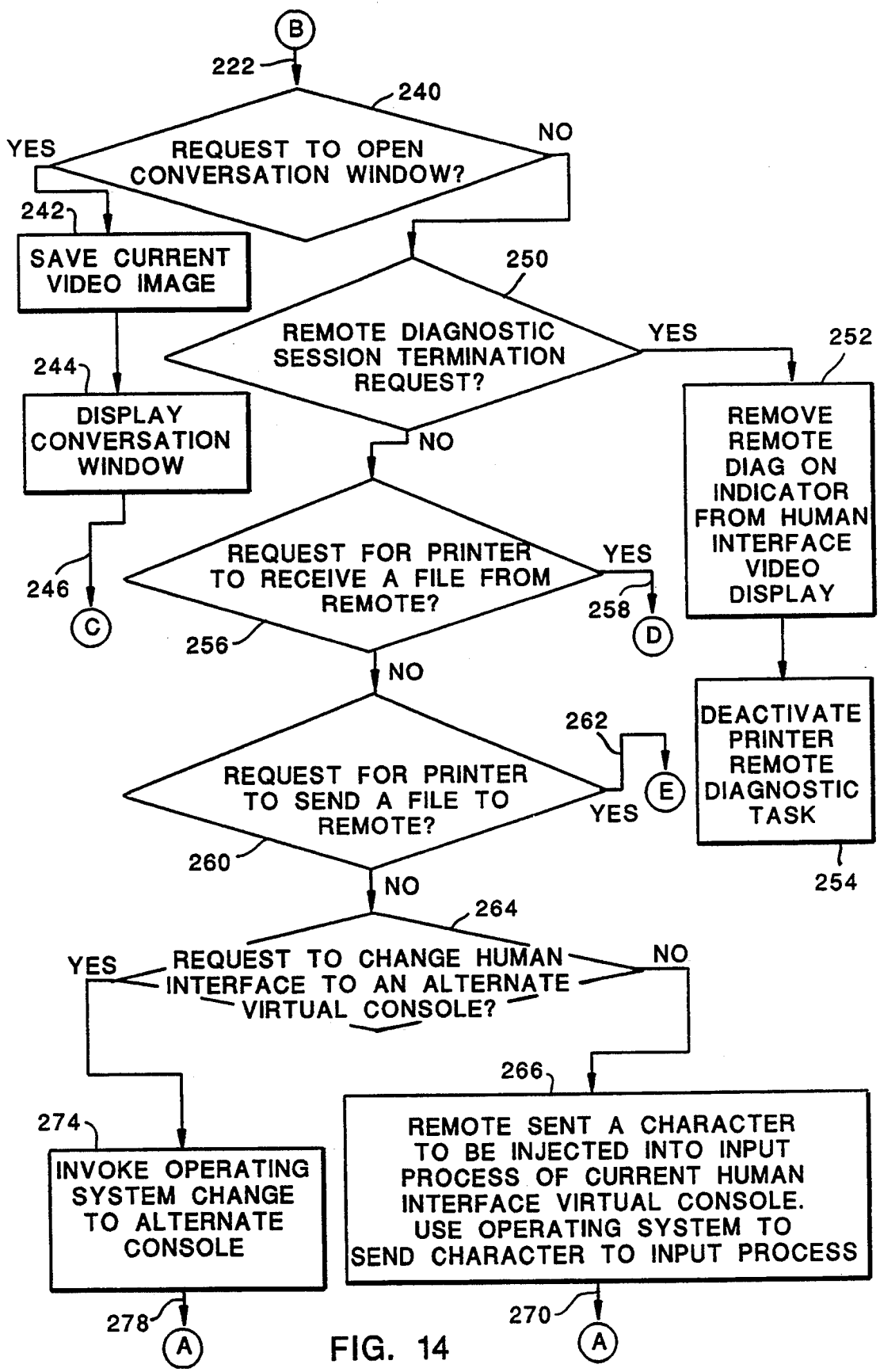

If no conversation window request is received from remote service computer 34, the alternative is a command from computer 4 which is processed by the remainder of the program illustrated in the right-hand portion of FIG. 14. Decision block 250 determines if the command is a termination request and, if so, it is processed as indicated in blocks 252 and 254. If not, decision block 256 determines if the command is a request to receive a file from remote service computer 34 and, if so, the program transfers to another routine through path 258 which will be described. Decision block 260 determines if the command is a request to send a file to remote service computer 34 and, if so, the program transfers to another routine through path 262 which will be described. If the command is not a termination request and not a file send or receive request, decision block 264 determines if it is a request to change to a different console. If not, what was sent from remote service computer 34 was a character to be injected in the input process of human interface computer as described in block 266. After accomplishing this, the program returns along path 270 to the screen transmission portion of FIG. 13.

On the other hand, if what was sent from remote service computer 34 was a request to change to an alternate virtual console, this is determined by decision block 264 causing the program to invoke an operating system change to an alternate console as indicated in block 274. As a result the program returns along path 278 to the screen transmission portion of FIG. 13. In particular, it is a feature of the QNX operating systems 50 and 120 previously described to include alternate virtual consoles which are provided by the operating system software. For example, considering console 98 shown in FIG. 2 it would provide access to certain databases. By means of an alternate virtual console, i.e. using operating system software, the operator can have access to additional databases which the screen manager 90 would not otherwise show, i.e. databases not provided normally on the screens. The remote diagnostic and monitoring system and method of the present invention has the ability to manipulate the virtual consoles and has the ability to inject commands on the different virtual consoles. In other words, remote diagnostic task 110 uses the basic operating system to determine which console is in operation and then handles the situation. Task 110 can inject keys into the process of operation system 10 if the system is on the primary human interface console 98, or task 110 can inject keys into the normal input process of operating system 50 of the computer 30 if the system is on an alternate virtual console.

Figure 15A:
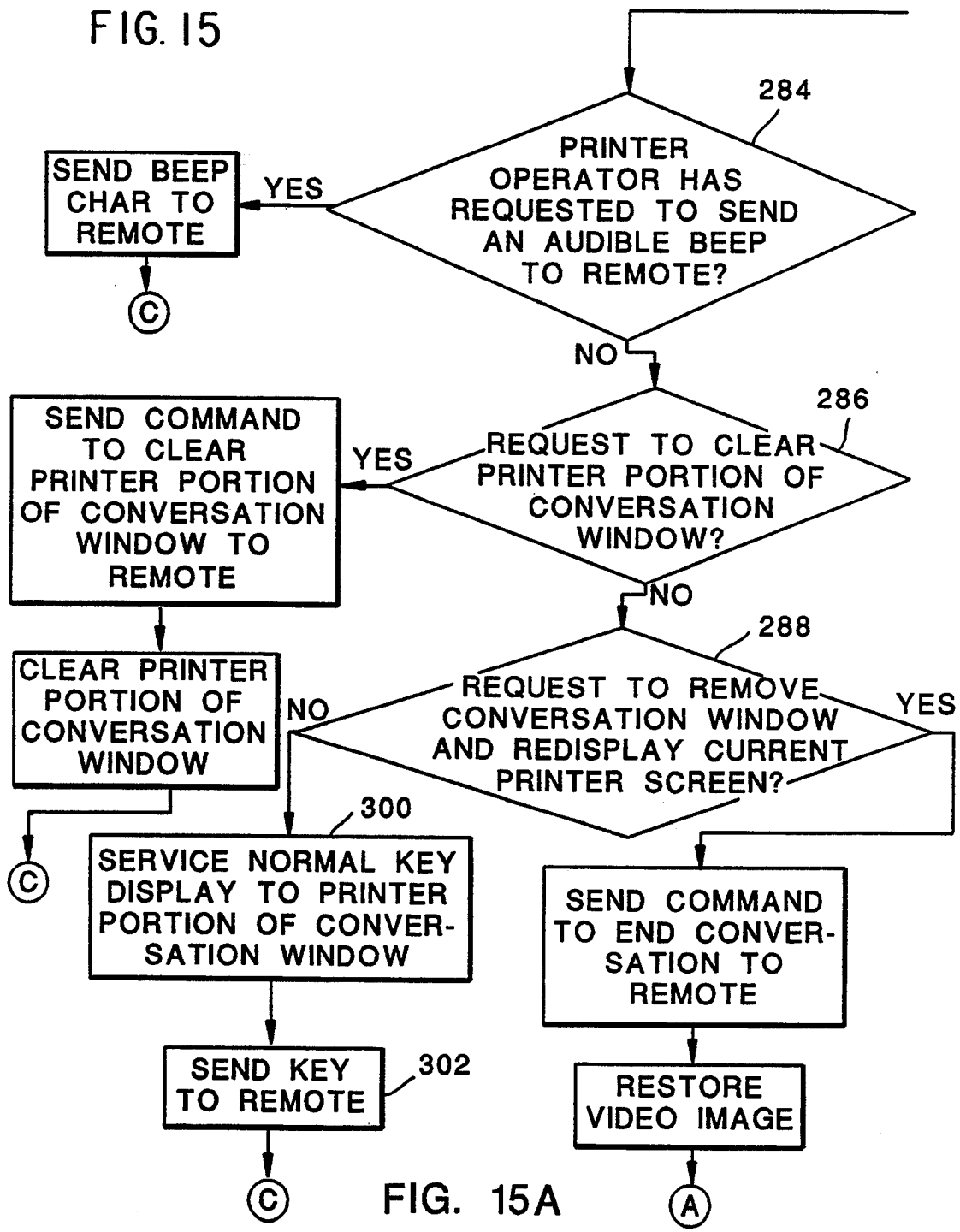
Figure 15B:
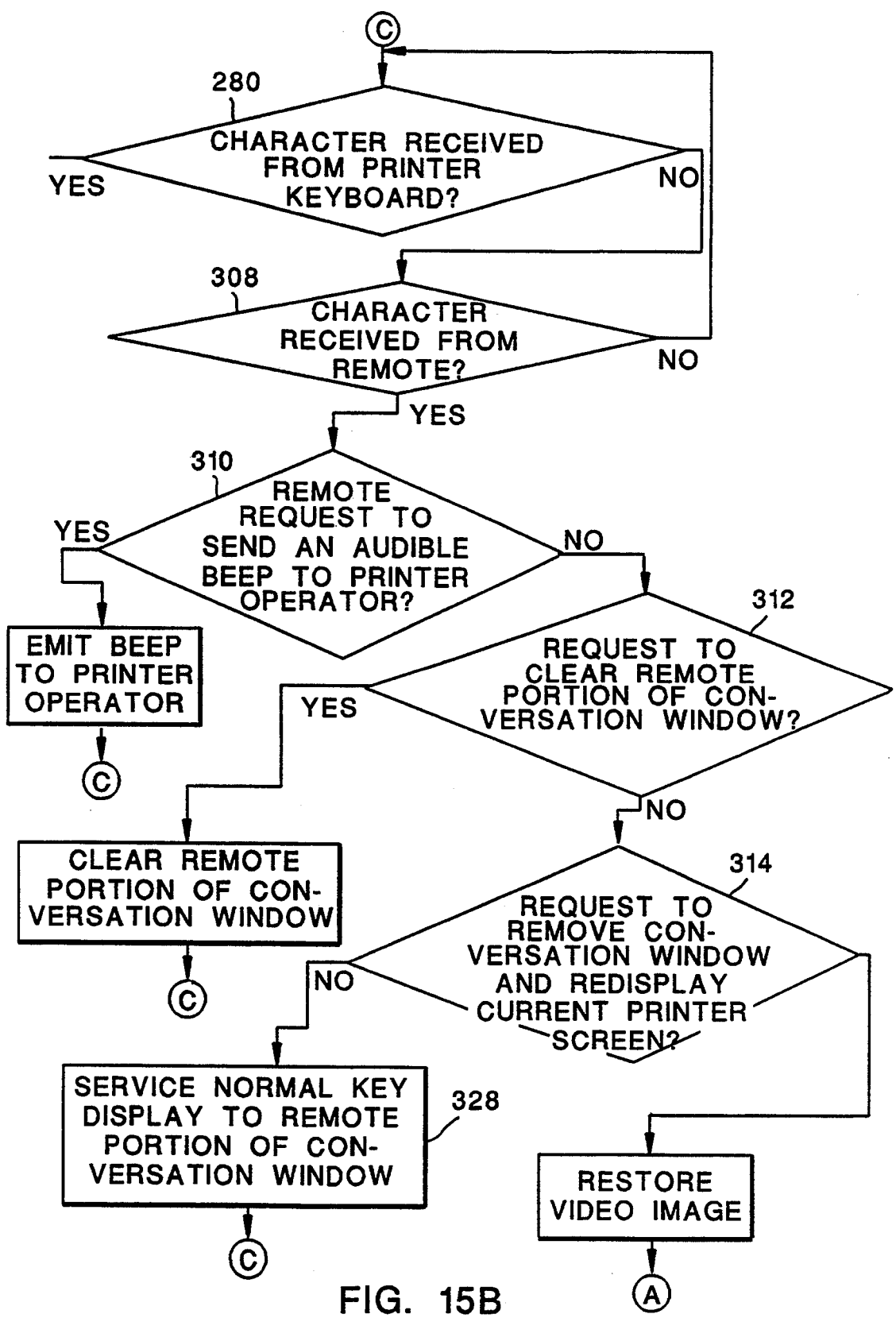

FIG. 15 illustrates the manner in which the program carries the conversation window function described in connection with FIG. 14. The request to open conversation window from the path in FIG. 14 is followed by decision block 280 to determine if a character is received from the keyboard 94 of human interface computer 30. If so, the portion of the program illustrated to the left in FIG. 15 functions to display the character on the upper portion 281 of the conversation window of display 96 in computer 30 as shown in FIG. 23 and to send the character to remote service computer 34 for display on the lower portion 282 of the conversation window of display 134 as previously described. If not, the portion of the program to the right in FIG. 15 functions to display what has been received from remote service computer 34. For each keystroke on keyboards 94 and 132 the program proceeds through the entire left-hand or right-hand path as illustrated in FIG. 15. In particular, decision blocks 284, 286 and 288 determine if the indicated requests have been made. If not, the program functions to display the key on the upper portion 281 of the conversation window on display 96 of human interface computer 30 as described in block 300. Thereafter, the key is transmitted to remote service computer 34 for display on the lower portion 282 of the screen 134 as indicated in block 302. If decision block 280 determines that no character is received from keyboard 94 of human interface computer 30, decision block 308 determines if a character has been received from remote service computer 34 via communications link 32. If not, the program recycles to the input of decision block 280, but if so decision blocks 310,312 and 314 determine if the indicated requests have been made. If not, the program functions to display the character received from remote service computer 34 on the lower portion 326 of the conversation window in display 96 of human interface computer 30 as described in block 328.

Figure 16:
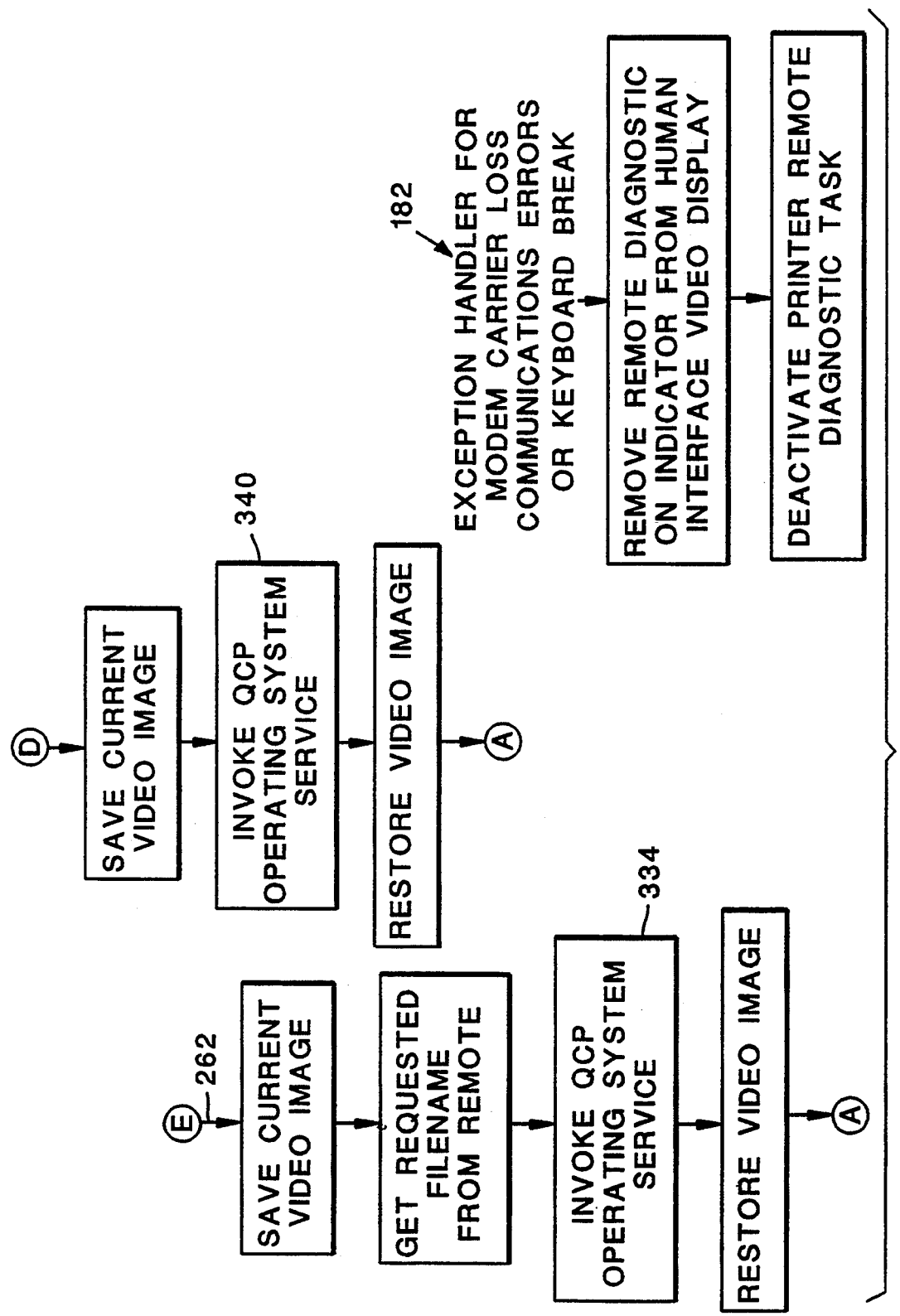

FIG. 16 illustrates file sending and receiving routines which are accessed from the portion of the program shown in FIG. 14. The routine at the left in FIG. 16 is employed when human interface computer 30 is requested to send a file to remote service computer 34. It is accessed from the YES output of decision block 260. The routine in the center of FIG. 16 is employed when human interface computer 30 is requested to receive a file from remote service computer. The qcp operating system service indicated in blocks 334 and 340 is the Quantum Communications Protocol which is a communications protocol used for sending and receiving files across the modem connection 40,44 between the QNX operating system based computers 30,34. Upon completion of the file sending/receiving task, both routines return to the decision block 190 in the screen transmission portion of the program illustrated in FIG. 13. The routine 182 at the right in FIG. 16 operates in response to modem carrier loss, communications errors or keyboard break in the manner indicated.

Figure 17:
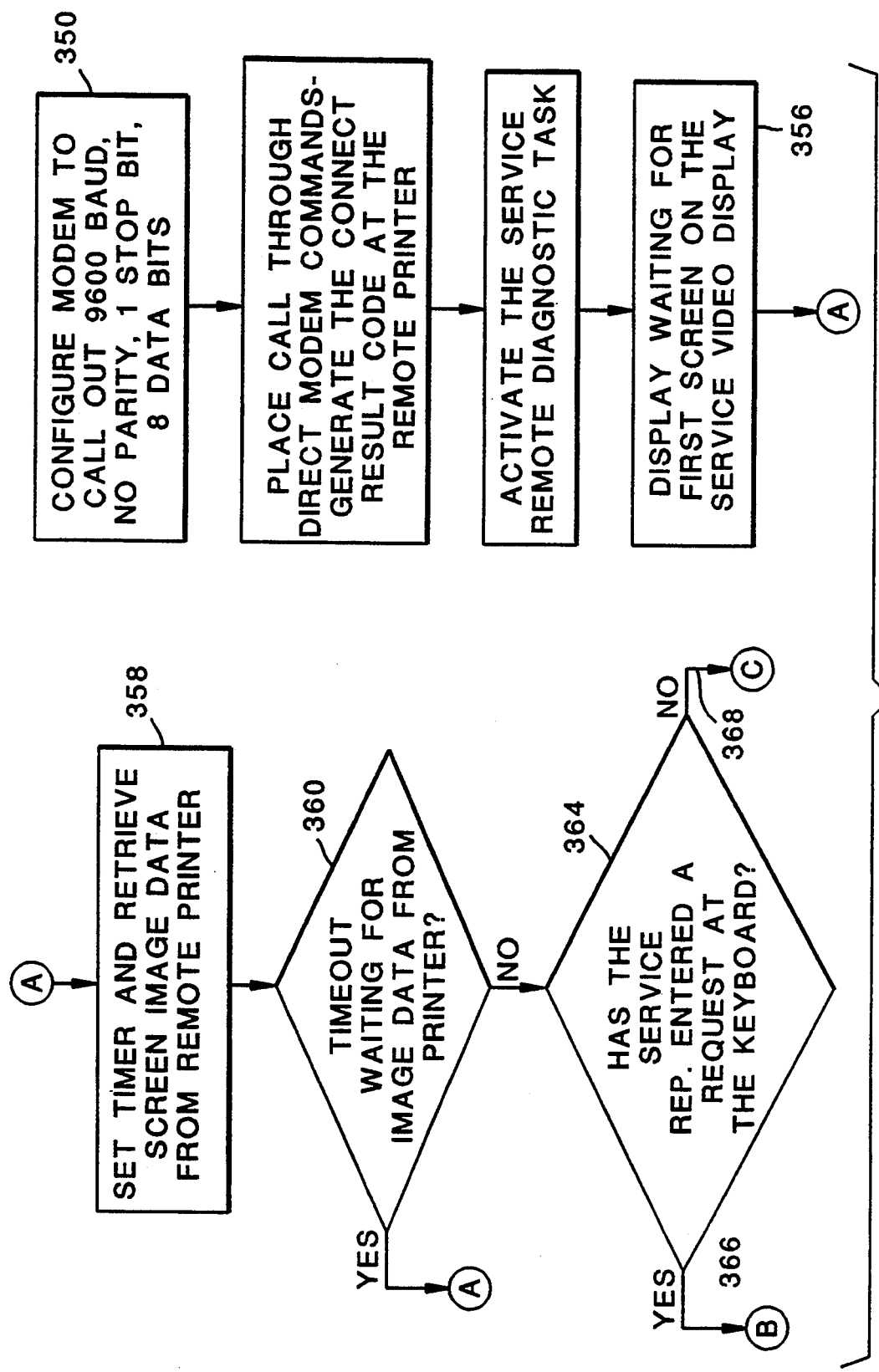

FIGS. 17-21 illustrate operation of the program in remote service computer 34 at the manufacturer/supplier site. Referring to the right-hand portion of FIG. 17 block 350 represents the configuration of modem 44, and the configuration steps are those specified for the particular modem employed, for example the illustrative Microcom AXPC9624C modem. Beginning with block 356, the remote service diagnostic task 126 is activated. The routine at the left in FIG. 17 is invoked and the remote service computer 34 awaits an image from human interface computer 30 as indicated in blocks 358 and 360. Once an image has been obtained, decision block 364 determines whether the service representative operating remote service computer 34 has entered a request at the keyboard 132. If so, the program proceeds along path 366 to the portion illustrated in FIG. 18 for servicing commands. If not, the program proceeds along path 368 to the portion illustrated in FIG. 19 for processing transmission of screen images.

Figure 18A:
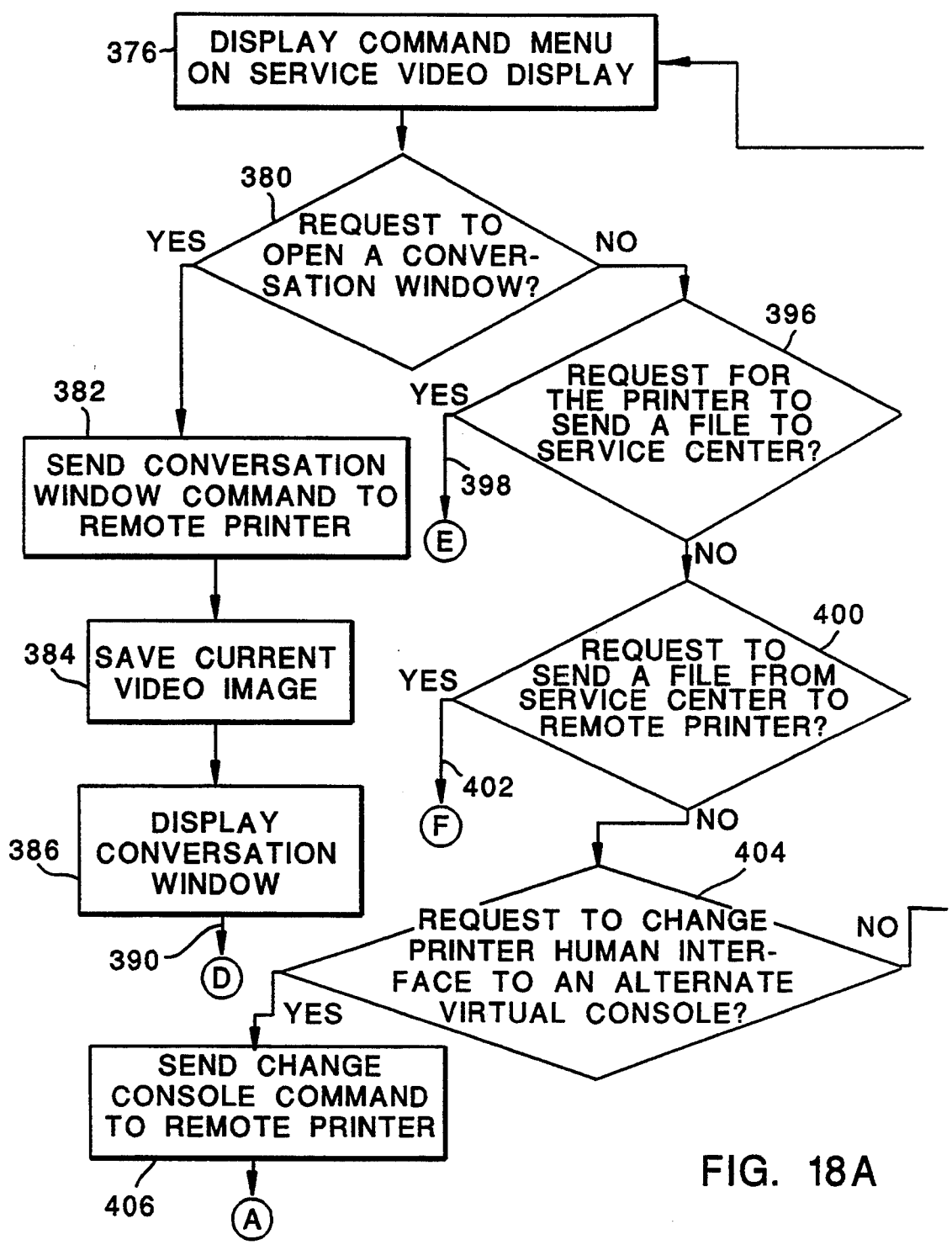
Figure 18B:
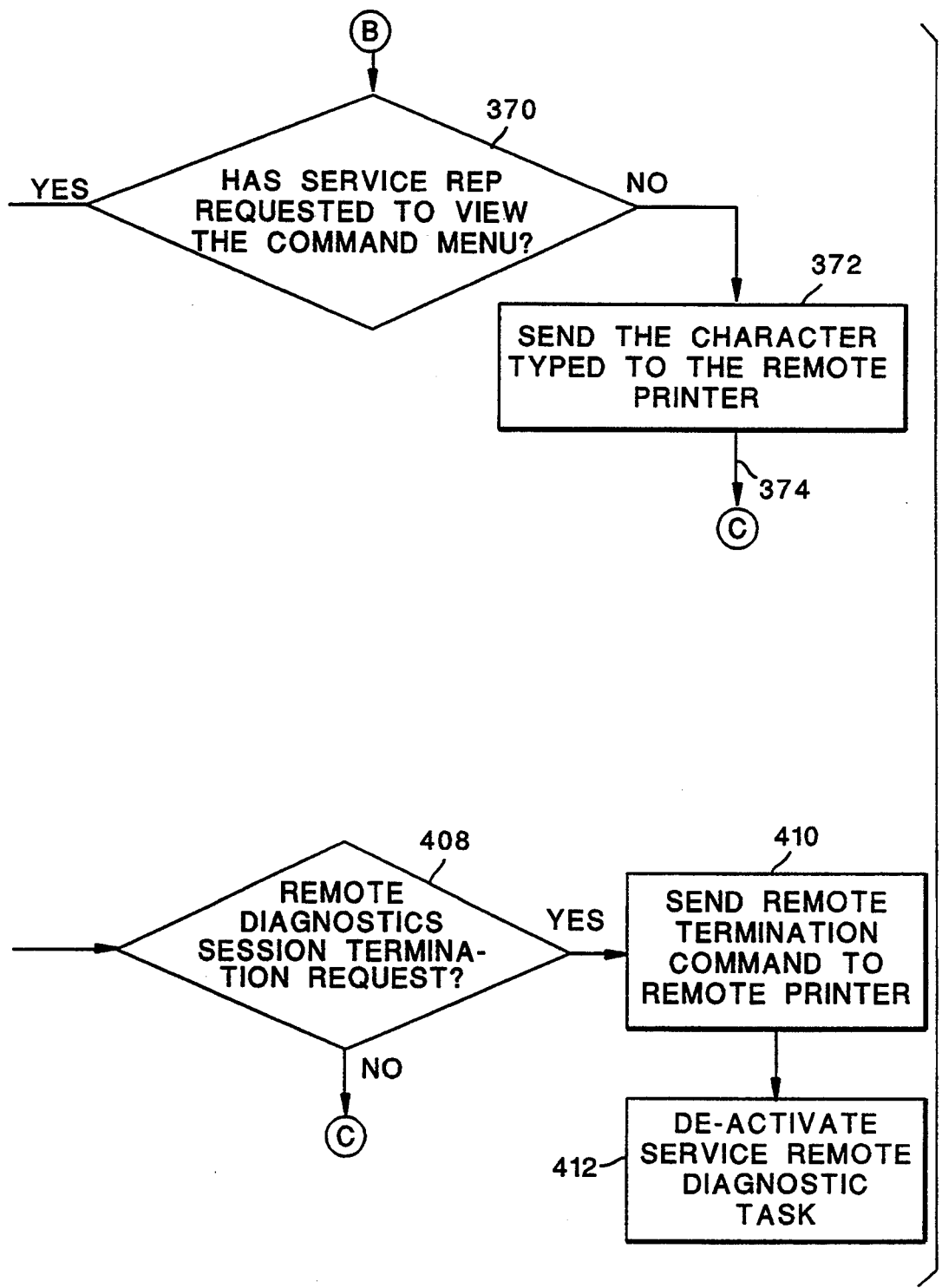

Referring now to FIG. 18, decision block 370 determines whether the service representative at remote service computer 34 has requested to view the command menu. If not, the program transmits to human interface computer 30 the character corresponding to whatever key was hit on keyboard 132 as indicated in block 372. In particular, this character is sent to the portion of the program described in block 266 in FIG. 14. The program then proceeds along path 374 to the screen image processing portion of FIG. 19 which will be described. On the other hand, if decision block 370 determines that the service representative has requested to view the command menu, the command menu is displayed on screen 134 of remote service computer 34 as indicated in block 376. The remainder of the program illustrated in FIG. 18 is the remote service computer 34 counterpart of the program in FIG. 14 for human interface computer 30. In particular, decision block 380 determines whether the operator of remote service computer 34 has requested to open a conversation window. If so, a conversation window command is sent to human interface computer 30 as indicated in block 382. The operations indicated in blocks 384 and 386 are similar to those of blocks 242 and 246, respectively, in FIG. 14. The program then proceeds along path 390 to the portion for carrying out the conversation window function which is illustrated in FIG. 20 and which will be described.

If no conversation window request has been made, the alternative is one of various commands entered at the option of the service representative operating remote service computer 34. These are processed by decision blocks 396, 400 and 404 in a manner similar to that of decision blocks 256, 260 and 264, respectively, in FIG. 14. If there is a request to change human interface computer 30 to an alternate virtual console, a change console command is sent to computer 30 as indicated in block 406 whereupon the program returns to the routine at the left-hand portion of FIG. 17 where it awaits screen image data from computer 30. If there is no request to charge consoles, decision block 408 determines if there is a termination request. If not, the program proceeds to the screen image processing portion of FIG. 19, and if so the termination is effected as described in blocks 410 and 412.

Figure 19:
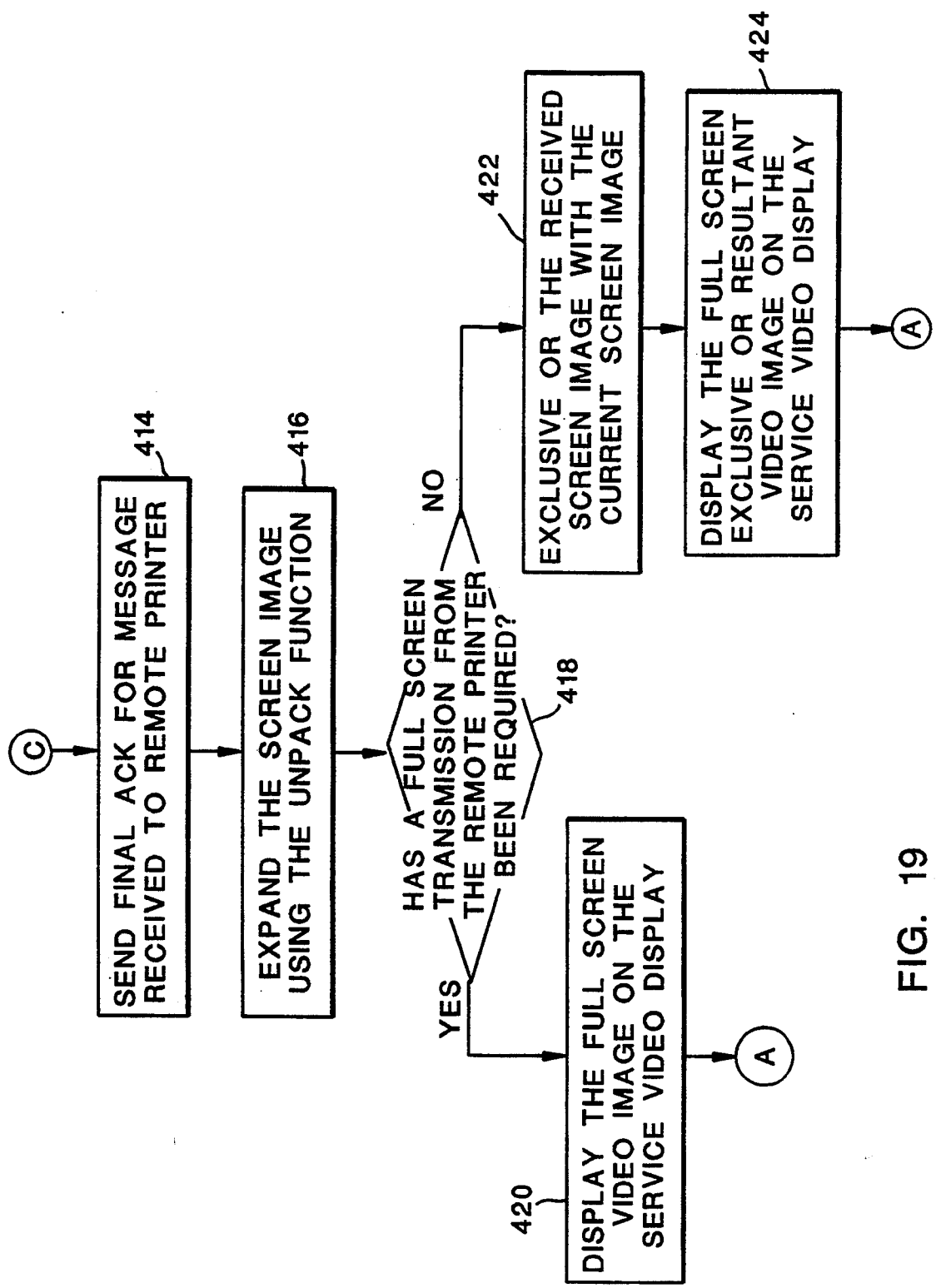

Referring now to the screen image processing portion illustrated in FIG. 19, an acknowledgement signal is sent to human interface computer 30 indicating that a message has been received as described in block 414. Next, as indicated in block 416, the screen image is expanded using the unpack function as previously described. Decision block 418 determines whether a full screen transmission from human interface computer 30 is required. A full screen transmission is required and has been received if the prior transmission was unsuccessful or if the remote service computer 34 has just completed execution of a menu command which overwrites the entire screen, for example the conversation window previously described. If a full screen image is required it is displayed on remote service computer 34 as indicated in block 420 whereupon the program returns to the routine at the left-hand portion of FIG. 17 where it awaits screen image data from computer 30. If less than a full screen image is required, the first step is to perform an Exclusive OR operation between the received screen image change representations and the current screen image as previously described and as indicated in block 422. Then what is displayed is the full screen resultant Exclusive OR image on display 134 of remote service computer 34 as indicated in block 424. The program then returns to the routine at the left-hand portion of FIG. 17 where it awaits screen image data from computer 30.

Figure 20A:
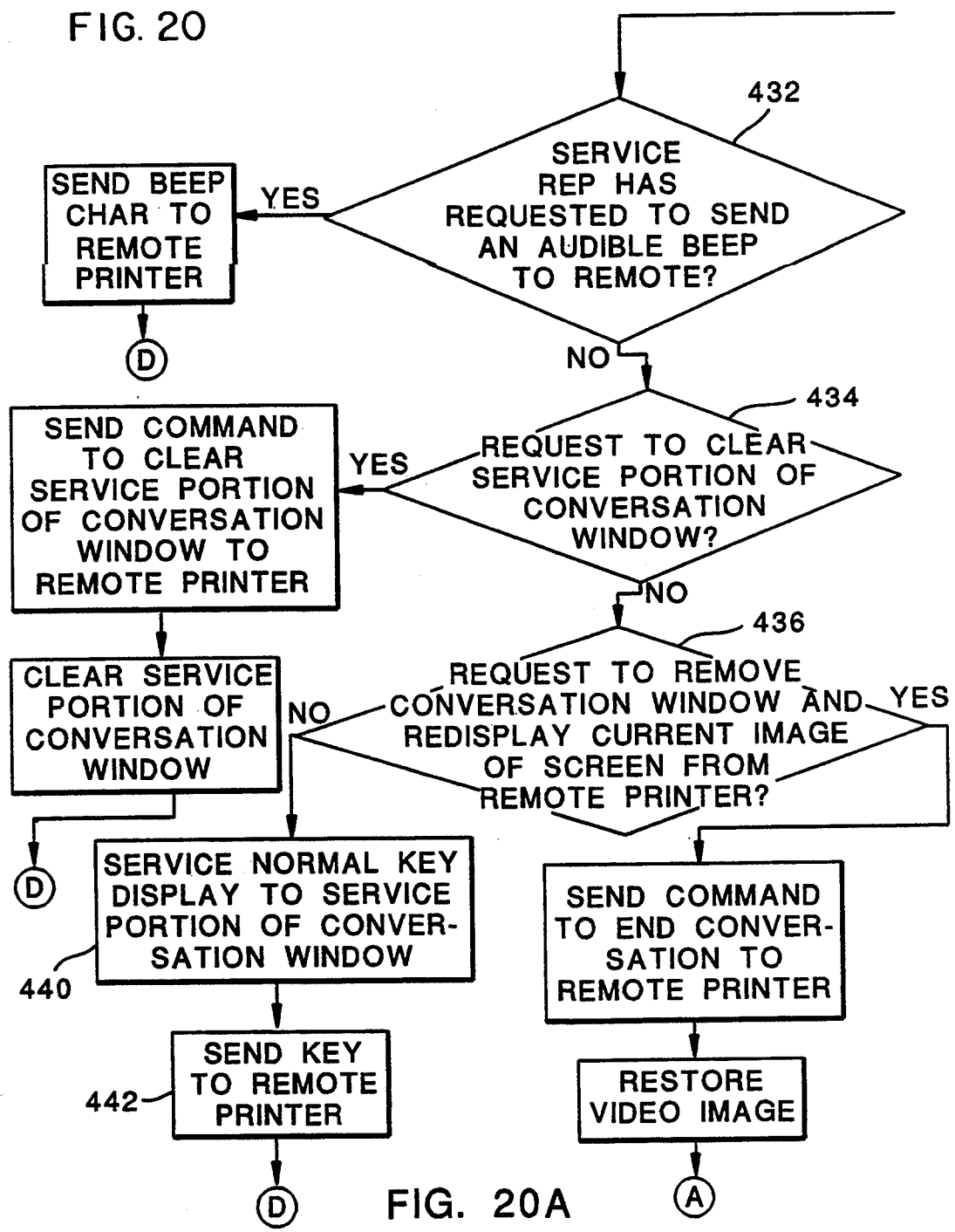
Figure 20B:
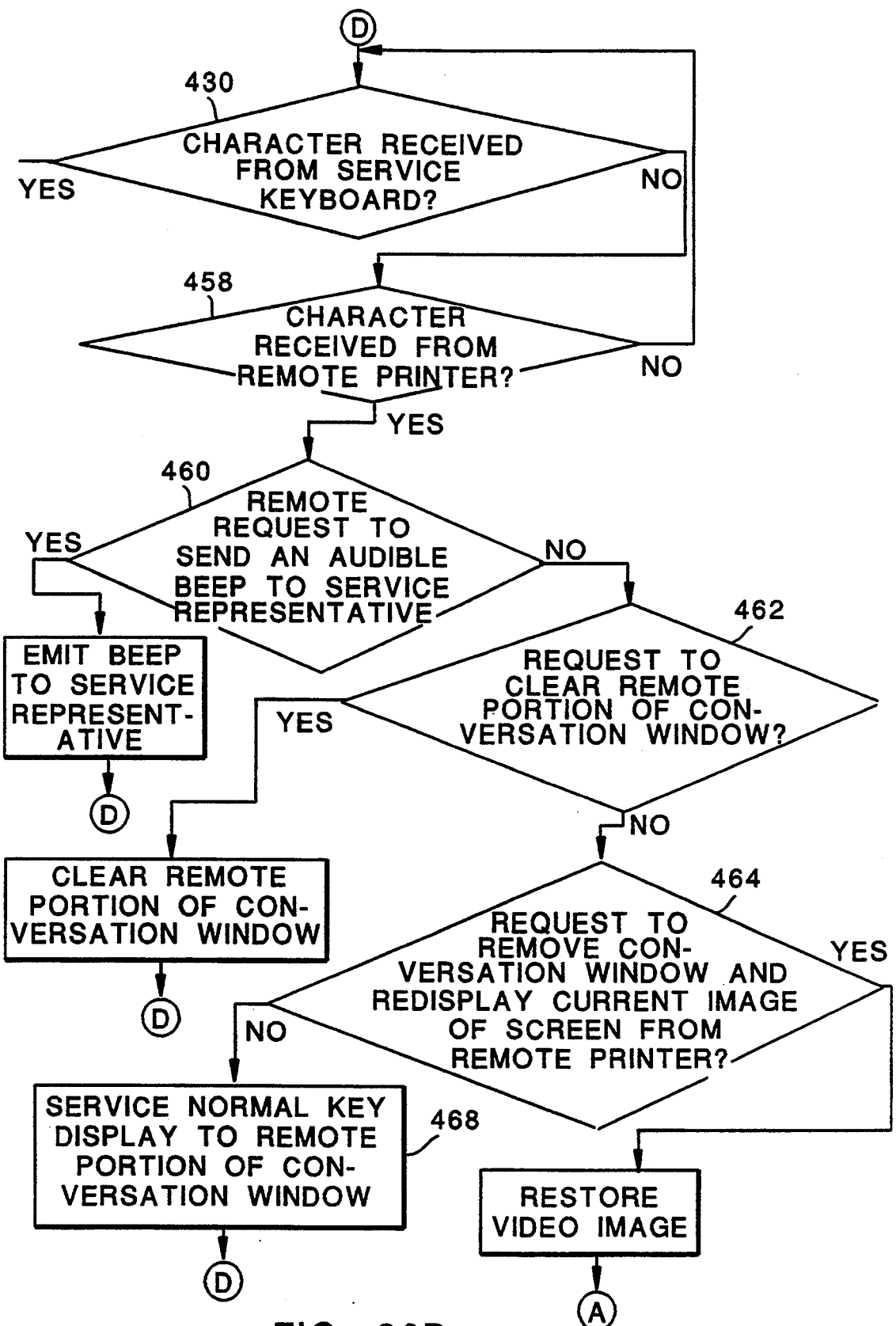

FIG. 20 illustrates the manner in which the program carries out the conversation window function described in connection with FIG. 18. The process illustrated in FIG. 20 is the remote service computer 34 counterpart of the process of FIG. 15 for human interface computer 30. The request to open conversation window from the path 390 in FIG. 18 is followed by decision block 430 to determine if a character is received from keyboard 132 of remote service computer 34. If so, decision blocks 432, 434 and 436 determine if the indicated requests have been made. If not, the program functions to display the key on the upper portion 438 of the conversation window on display 134 of remote service computer 34 as described in block 440 and shown in FIG. 23. Thereafter, the key is transmitted to human interface computer 30 for display on the lower portion 326 of the display 96 as indicated in block 442. If decision block 430 determines that no character is received from keyboard 132 of computer 34, decision block 458 determines if a character has been received from human interface computer 30 via communications link 32. If not, the program recycles to the input of decision block 430, but if so decision blocks 460, 462 and 464 determine if the indicated requests have been made. If not, the program functions to display the character received from human interface computer 30 on the lower portion 282 of the conversation window in display 134 of remote service computer 34 as described in block 468.

Figure 21:
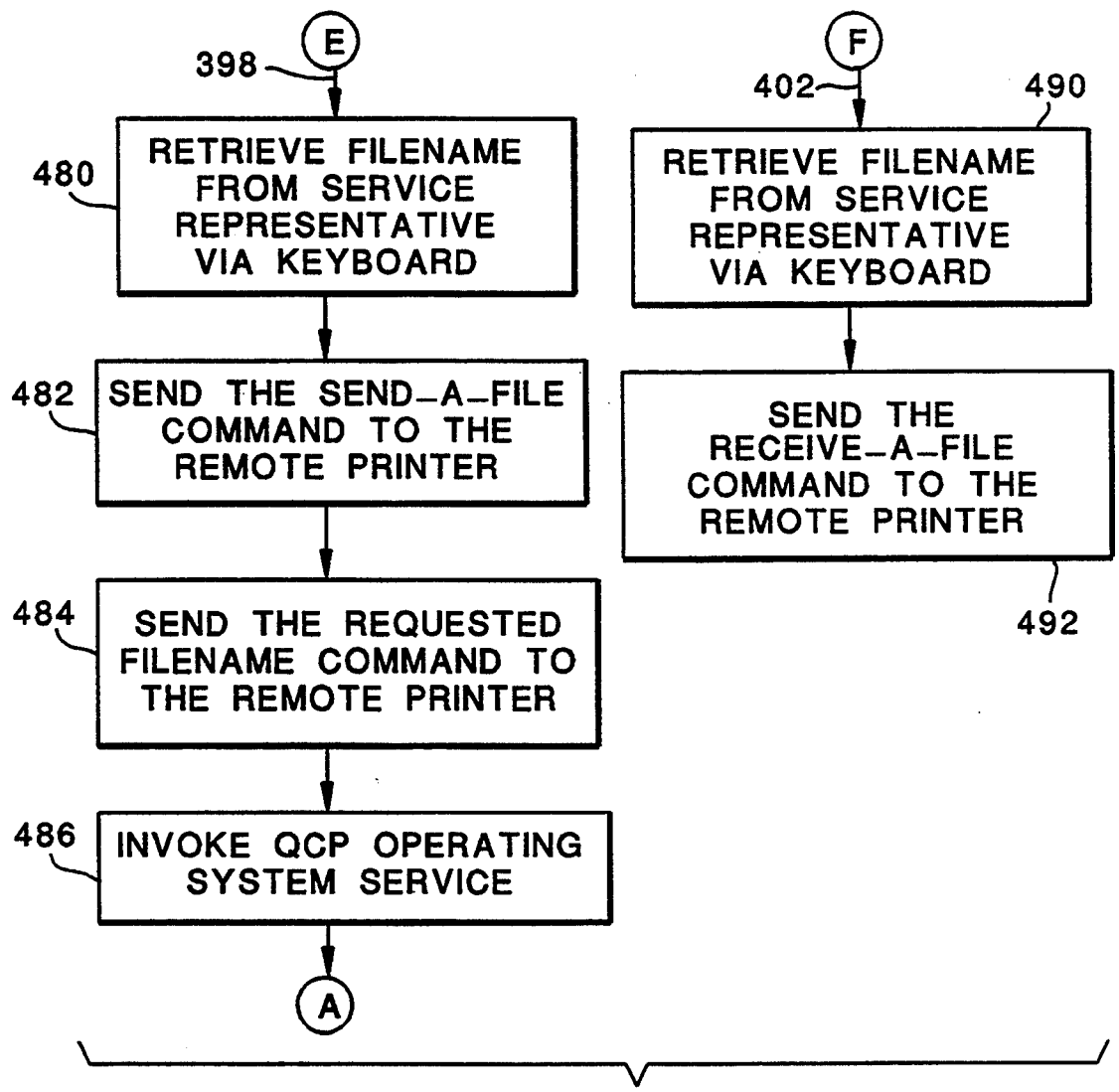

FIG. 21 illustrates the file sending and receiving routines which are accessed from the portion of the program shown in FIG. 18. The routine at the left in FIG. 21 is employed when remote service computer 34 requests human interface computer 30 to send a file to computer 30. It is accessed from the YES output of decision block 396. The filename is retrieved via keyboard 132 as indicated in block 480, the send-a-file and requested filename commands are sent to human interface computer 30 as indicated in blocks 482 and 484, respectively, and then the qcp operating system previously described is invoked as indicated in block 486. The program then returns to the routine at the left-hand portion of FIG. 17 where it awaits screen image data from computer 30. The routine at the right in FIG. 21 is employed when remote service computer 34 is to receive a file from human interface computer 30. The filename is retrieved via keyboard 132 as indicated in block 490 and then the receive-a-file command is sent to human interface computer 30 as indicated in block 492. The program then returns to the routine at the left-hand portion of FIG. 17 where it awaits screen image data from computer 30.

By way of example, in an illustrative system and method, the program described in connection with the flouchant of FIGS. 10–21 can be run on the above-mentioned Hewlett Packard HPES12 computers with QNX operating systems with the program being implement in C language.

It is therefore apparent that the present invention accomplishes its intended objects. While an embodiment of the present invention has been described in detail, that is for the purpose of illustration, not limitation.

What is claimed is:

1. A remote diagnostic and monitoring system for use with an operation system for performing functions to be monitored and controlled and including a plurality of processors connected in a network and each relating to a functional aspect of said operation system and wherein an interface computer is connected to said network of said operation system for processing information and commands to and from said operation system, said operating system requiring a flexible multitasking interface to a real time control system, said computer including means for performing a plurality of application tasks related to operations performed by said operation system and including a multitasking operating system for servicing said application tasks, said diagnostic and monitoring system comprising:

a) means in said interface computer for performing a remote diagnostic task also serviced by said multitasking operating system, said remote diagnostic task running on said operation system to transmit screen images in a form expected at a physically remote station linked to said computer, and said remote diagnostic task injecting commands received from the remote station through said computer into at least one of said application tasks related to operations performed by said operation system such that said remote station is transparent to said applications tasks, said remote diagnostic task being grouped with functionally partitioned application tasks in said interface computer and using said multitasking operating system of said interface computer in the same manner as said application tasks so that the remote station effects no change in the behavior of said operating system due to the source of the commands;

b) a communication link including modem means and connected at one end to said computer; and c) a remote service computer at said remote station connected to the other end of said communication link and having a multitasking operating system, said service computer including means for performing a remote diagnostic task in a manner utilizing services of said multitasking operating system for displaying screen images received from said interface computer through said communication link and for transmitting commands initiated at said service computer to said interface computer via said communication link for running on said operation system;

d) said remote diagnostic task being able to initiate and monitor from a physically remote location any procedures and controls run on said interface computer for controlling and monitoring the operation system;

e) so that expert personnel at said remote station can provide via said remote service computer ongoing technical support for personnel at said operation system including remote monitoring of said operation system and remote diagnosis of problems occurring in said operation system.

2. A system according to claim 1, wherein said operation system includes a plurality of microcomputers for controlling said operation system and wherein said interface computer is operatively connected to said microcomputers to provide data and instructions to said microcomputers.

3. A system according to claim 1, further including a plurality of virtual consoles operatively provided by said multitasking operating system of said interface computer, each of said virtual consoles including means for input of commands and including visual display means, and wherein said means for performing said remote diagnostic task switches operation among selected ones of said virtual consoles in response to commands from said remote service computer.

4. A system according to claim 1, wherein said operation system comprises a photofinishing machine for exposing negatives onto a photographic medium.

5. A system according to claim 1, wherein said interface computer and said remote service computer are sufficiently identical so that the display on said remote service computer can be an exact duplicate of the display on said interface computer.

6. A system according to claim 1, further including a console comprising a keyboard and a display operatively connected to said interface computer, said remote diagnostic task detecting which portion of the operation system is controlling said console at the moment a command is received and sending a command received from a remote site to the active portion of the operation system.

7. In combination with an operation system requiring a flexible multitasking interface to a real time control system and containing a plurality of microcomputers connected in a network for controlling individual operations performed by said operation system:
   a) an interface computer operatively connected to said microcomputers through said network for providing data and instructions to said microcomputers, said interface computer including means for providing a plurality of functionally partitioned application tasks grouped with a remote diagnostic task, one or more of said application tasks of said interface computer servicing one or more of said microcomputers of said operation system, said remote diagnostic task operating on said interface computer and providing the ability to initiate and monitor any of said application tasks from a physically remote location, said interface computer further including an operating system used by said application tasks and by said remote diagnostic task in a similar manner such that said remote diagnostic task is transparent to said application tasks; and
   b) a communication link operatively connected to said computer in a manner providing two way communication with diagnostic means located physically remote from said operation system and linked thereto for controlling the performance of said remote diagnostic task;
   c) so that expert personnel at said diagnostic means can provide via said communication link and said remote diagnostic task ongoing technical support for personnel at said operating system including remote monitoring of the operation system and remote diagnosis of problems occurring in the operation system.

8. The combination according to claim 7, wherein said diagnostic means comprises a remote service computer having a multitasking operating system and having means for performing a remote diagnostic task in a manner utilizing services of said multitasking operating system for displaying screen images received from said interface computer through said communication link and for transmitting commands initiated at said service computer to said interface computer via said communication link for running on said operation system.

9. The combination according to claim 7, wherein said interface computer and said remote service computer are sufficiently indentical so that the display on said remote service computer can be an exact duplicate of the display on said interface computer.

10. The combination according to claim 7, further including a plurality of virtual consoles operatively connected to said interface computer, each of said virtual consoles including means for input of commands and including visual display means, and wherein said remote diagnostic task switches operation among selected ones of said virtual consoles in response to commands from said remote service computer.

11. The combination according to claim 7, wherein said operation system comprises a photofinishing machine for exposing negatives onto a photographic medium.

12. A method for monitoring and diagnosis of a system having a multitasking interface to real time control in said system comprising the steps of:
   a) providing images on the screen of an interface computer operatively connected to the real time control of said system, said images containing information on the operation of said system;
   b) transmitting said screen images on a real time basis to a service computer at a location physically remote from said system;
   c) displaying said images on the screen of said service computer;
   d) providing input of commands to said service computer relating to the operation of said system;
   e) transmitting said commands to said interface computer; and
   f) executing said commands received at said interface computer in a manner controlling the operation of said system or said interface computer;
   g) so that expert personnel at said remote location can provide via said service computer ongoing technical support for personnel at said system including remote monitoring of said system and remote diagnosis of problems occurring in said system.

13. A method according to claim 12, wherein said interface computer performs a number of applications tasks on said real time control and wherein said steps of providing and transmitting said screen images and executing said received commands are performed in a similar manner so as to be transparent to said applications tasks.

14. A method according to claim 13, wherein said interface computer includes an operating system for servicing said applications tasks and wherein said steps of providing and transmitting said screen images and executing said received commands are performed by a diagnostic task grouped with said applications tasks and serviced also by said operating system.

15. A method according to claim 12, wherein said steps of transmitting said screen images on a real time basis comprises transmitting only the changes in the screen images.

16. A method according to claim 15, wherein said step of transmitting only the changes in the screen images comprises:
   a) processing the screen images at said interface computer with a packing algorithm; and
   b) processing the transmission received at said service computer with an unpacking algorithm to provide images for display on the screen of said service computer.

17. A method according to claim 12, further comprising:
   a) providing a visually delineated area simultaneously on the screen of said interface computer and on the screen of said service computer;
   b) routing all input to the program providing said area while it is active; and
   c) transmitting keyboard input messages between said computers for visual display in said areas.

18. A method for monitoring and diagnosis of an operation system containing a plurality of microcomputers for controlling the system wherein an interface computer is connected to said microcomputers for providing data and instructions to said microcomputers, said operating system requiring a flexible multitasking interface to a real time control system, said interface computer being provided with a plurality of functionally partitioned application tasks and having an operating system used by the application tasks, said method comprising:

a) providing a remote diagnostic task for performance by said interface computer;

b) grouping said remote diagnostic task with said application tasks;

c) causing said remote diagnostic task to utilize said operation system in a manner similar to that of said application tasks;

d) so that said remote diagnostic task enables remote diagnosis and monitoring of said operation system in a manner not changing the behavior of said system due to the source of the remote diagnosis and monitoring and therefore is transparent; and e) so that expert personnel at a physically remote location can provide via said remote diagnostic task ongoing technical support for personnel at said operation system including remote monitoring of the operation system and remote diagnosis of problems occurring in the operation system.

19. A method according to claim 18, further including providing two way communication between said interface computer and diagnostic means located remote from said operation system, said providing two way communication allowing control of the performance of said remote diagnostic task.

20. A method according to claim 18, further including a) providing a remote service computer having a multitasking operating system;

b) providing a remote diagnostic task for performance by said remote service computer in a manner utilizing said multitasking operating system; and c) providing two-way communication between said interface computer and said remote service computer.

21. A method according to claim 20, further including displaying at said remote service computer screen images received from said interface computer.

22. A method according to claim 20, further including transmitting commands initiated at said remote service computer to said interface computer for running on said operation system.

23. A method for monitoring and diagnosis of a system having a multitasking interface to real time control in said system comprising the steps of:

a) providing images on the screen of an interface computer operatively connected to the real time control of said system, said images containing information about the operation of said system;

b) determining whether transmission of the entire screen image is required utilizing predetermined criteria;

c) storing the current image in the memory of said computer;

d) condensing the entire screen image using a packing algorithm; and e) transmitting the condensed screen image to a service computer at a location remote from said system;

f) so that expert personnel at said remote location can provide via said service computer ongoing technical support for personnel at said system including remote monitoring of said system and remote diagnosis of problems occurring in said system.

24. A method according to claim 23, further including processing the image received at said service computer using an unpacking algorithm to provide an image for display on the screen of said service computer.

25. A method according to claim 24, further including:

a) determining whether a full screen transmission from said interface computer is required; and b) displaying the full screen image on said service computer.

26. A method according to claim 23, wherein image transmission is unidirectional from said interface computer to said service computer.

27. A method for monitoring and diagnosis of a system having a multitasking interface to real time control in said system comprising the steps of:

a) providing images on the screen of an interface computer operatively connected to the real time control of said system, said images containing information on the operation of said system, said images containing at least some time-varying components;

b) storing said images in the memory of said computer;

c) performing a logical operation on binary representations of components of the current and previously stored images to provide one result when the compared components are identical and another, different result when the compound components are different;

d) condensing the result using a screen packing algorithm; and e) transmitting the condensed result to a service computer at a remote location;

f) so that expert personnel at said remote location can provide via said service computer ongoing technical support for personnel at said system including remote monitoring of said system and remote diagnosis of problems occurring in said system.

28. A method according to claim 27, further including processing the image received at said service computer to provide an image for display on the screen of said service computer.

29. A method according to claim 28, wherein said step of processing the received image comprises:

a) expanding the received image using an unpacking algorithm to provide an expanded image;

b) performing a logical operation on binary representations of components of the current and previously stored received images to provide one result when the compared components are identical and another, different result when the compared components are different; and c) displaying the full screen image result of the logical operation on said service computer.

30. A method according to claim 27, wherein said logical operation is Exclusive OR.

31. A method according to claim 29, wherein said logical operation is Exclusive OR.

32. A method according to claim 27, wherein image transmission is unidirectional from said human interface computer to said service computer.

33. A remote diagnostic and monitoring system for use with an operation system for performing functions to be monitored and controlled wherein an interface computer is connected to said operation system for processing information and commands to and from said operation system, said operation system requiring a flexible multitasking interface to a real time control system, said computer including means for performing a plurality of application tasks related to operations performed by said operation system and including a multitasking operating system for servicing said application tasks, said diagnostic and monitoring system comprising:

a) means in said interface computer for performing a remote diagnostic task also serviced by said multitasking operating system for running on said operation system to transmit screen images in a form expected at a remote station linked to said computer and for injecting commands received from the remote station through said computer into at least one of said application tasks of said operation system;

b) a keyboard and a display connected to said interface computer;

c) a communication link including modem means and connected at one end to said interface computer;

d) a remote service computer connected to the other end of said communication link and having a multitasking operating system, said service computer including means for performing a remote diagnostic task in a manner utilizing services of said multitasking operating system for displaying screen images received from said interface computer through said communication link and for transmitting commands initiated at said service computer to said interface computer via said communication link for running on said operation system;

e) a keyboard and a display connected to said service computer;

f) means in said interface computer for providing a conversation window on said display of said interface computer, said conversation window including a first area for displaying input from the keyboard of said interface computer and a second area for displaying communications received from said service computer;

g) means in said service computer for providing a conversation window on said display of said service computer, said conversation window including a first area for displaying input from the keyboard of said service computer and a second area for displaying communications received from said interface computer; and h) said operating systems of said interface computer and said service computer routing all input and modem input to said means for providing said conversation windows so that keyboard input messages are transmitted between said computers for visual display in said areas;

i) so that expert personnel at said remote station can provide via said remote service computer ongoing technical support for personnel at said operation system including remote monitoring of said operation system and remote diagnosis of problems occurring in said operation system.

34. A method for monitoring and diagnosis of an operation system containing a plurality of microcomputers for controlling the system wherein an interface computer having a keyboard and display is connected to said microcomputers for providing data and instructions to said microcomputers, said operation system requiring a flexible multitasking interface to a real time control system, said interface computer being provided with a plurality of functionally partitioned application tasks and having an operating system used by the application tasks, said method comprising:

a) providing a remote diagnostic task for performance by said interface computer;

b) providing a remote service computer having a keyboard and display and having a multitasking operating system;

c) providing a remote diagnostic task for performance by said remote service computer in a manner utilizing said multitasking operating system;

d) providing two-way communication between said interface computer and said remote service computer;

e) providing in said interface computer a conversation window on said display of said interface computer, said conversation window including a first area for displaying input from the keyboard of said interface computer and a second area for displaying communications received from said service computer;

f) providing in said service computer a conversation window on said display of said service computer, said conversation window including a first area for displaying input from the keyboard of said service computer and a second area for displaying communications received from said interface computer; and g) utilizing said operating systems of said interface computer and said service computer to route all input in a manner such that in providing said conversation windows keyboard input messages are transmitted between said computers for visual display in said areas;

h) so that expert personnel at a physically remote location can provide via said remote service computer ongoing technical support for personnel at said operation system including remote monitoring of said operation system and remote diagnosis of problems occurring in said operation system.

35. A remote diagnostic and monitoring system for use with an operation system for performing functions to be monitored and controlled wherein an interface computer is connected to said operation system for processing information and commands to and from said operation system, said operation system requiring a flexible multitasking interface to a real time control system, said computer including means for performing a plurality of application tasks relative to operations performed by said operation system and including a multitasking operating system for servicing said application tasks, said diagnostic and monitoring system comprising:

a) means in said interface computer for performing a remote diagnostic task also serviced by said multitasking operating system for running on said operation system to transmit screen images in a form expected at a physically remote station linked to said computer and for injecting commands received from the remote station through said computer into at least one of said application tasks of said operation system;

b) a primary console comprising a keyboard and a display connected to said interface computer;

c) a communication link including modem means and connected at one end to said interface computer;

d) a remote service computer at said remote station connected to the other end of said communication link and having a multitasking operating system, said service computer including means for performing a remote diagnostic task in a manner utilizing services of said multitasking operating system for displaying screen images received from said interface computer through said communication link and for transmitting commands initiated at said service computer to said interface computer via said communication link for running on said operation system;

e) said operating system of said interface computer providing at least one alternate virtual console including means for input of commands and including visual display means; and f) said remote diagnostic task injecting commands into the process of said operation system if said primary console is active and injecting commands into said operating system of said interface computer if said virtual console is active;

g) so that expert personnel at said physically remote station can provide via said remote service computer ongoing technical support for personnel at said operation system including remote monitoring of said operation system and remote diagnosis of problems occurring in said operation system.

36. A system according to claim 35, including a plurality of alternate virtual consoles and wherein said remote diagnostic task uses said operating system of said interface computer to determine which console is in operation.

37. A method for monitoring and diagnosis of an operation system containing a plurality of microcomputers for controlling the system wherein an interface computer having a primary console comprising a keyboard and display is connected to said microcomputers for providing data and instructions to said microcomputers, said operation system requiring a flexible multitasking interface to a real time control system, said interface computer being provided with a plurality of functionally partitioned application tasks and having an operating system used by the application tasks, said method comprising:

a) providing a remote diagnostic task for performance by said interface computer;

b) providing a remote service computer at a physically remote location and having a multitasking operating system;

c) providing a remote diagnostic task for performance by said remote service computer in a manner utilizing said multitasking operating system;

d) providing two-way communication via modem means between said interface computer and said remote service computer;

e) utilizing said operating system of said interface computer to provide at least one alternate virtual console including means for input of commands and including visual display means; and f) utilizing said remote diagnostic task to inject commands into the process of said operation system if said primary console is active and to inject commands into said operating systems of said interface computer if said virtual console is active;

g) so that expert personnel at said physically remote location can provide via said remote service computer ongoing technical support for personnel at said operation system including remote monitoring of said operation system and remote diagnosis of problems occurring in said operation system.

38. A method according to claim 37 further including:

a) providing a plurality of alternate virtual consoles; and b) causing said remote diagnostic task to use said operating system of said interface computer to determine which console is in operation.

* * * * *